United States Patent [19]
Gere et al.

[11] Patent Number: 5,590,617
[45] Date of Patent: Jan. 7, 1997

[54] AMPHIBIOUS VEHICLE

[75] Inventors: Gary M. Gere, Menlo Park; Russell L. Holder, Jr., Monterey; Louis J. Musetti, Seaside; Ray Ramsey, Jr., Pebble Beach, all of Calif.

[73] Assignee: Aquastrada International Corporation, Monterey, Calif.

[21] Appl. No.: 444,110

[22] Filed: May 18, 1995

Related U.S. Application Data

[62] Division of Ser. No. 384,461, Jan. 31, 1995, which is a continuation of Ser. No. 80,641, Jun. 21, 1993, abandoned, which is a continuation of Ser. No. 902,660, Jun. 23, 1992, abandoned.

[51] Int. Cl.$^6$ .................................................. B63B 35/00
[52] U.S. Cl. ............................................................ 114/270
[58] Field of Search .............................. 364/925, 925.3, 364/925.4, 424.01; 180/252; 446/153, 154; 160/165; 116/26; 340/984; 114/270, 344, 145 R, 145 A; 440/900, 41, 49, 38

[56] References Cited

U.S. PATENT DOCUMENTS

| | | | |
|---|---|---|---|
| 3,159,134 | 12/1964 | Winnen | 114/145 R |
| 3,487,802 | 6/1970 | Roy | 114/270 |
| 3,765,368 | 10/1973 | Asbeck | 114/270 |
| 3,903,831 | 9/1975 | Bartlett et al. | 114/270 |
| 3,933,112 | 1/1976 | Veazey | 114/270 |
| 4,008,679 | 2/1977 | Bozzano | 114/270 |
| 4,241,686 | 12/1980 | Westphalen | 440/59 |
| 4,387,661 | 6/1983 | Duff | 114/145 R |
| 4,838,194 | 6/1989 | Williamson | 114/270 |
| 4,958,584 | 9/1990 | Williamson | 114/270 |
| 5,181,478 | 1/1993 | Berardi | 114/270 |
| 5,244,425 | 9/1993 | Tasaki | 440/47 |

*Primary Examiner*—Robert J. Oberleitner
*Assistant Examiner*—C. T. Bartz
*Attorney, Agent, or Firm*—Flehr, Hohbach, Test, Albritton & Herbert

[57] ABSTRACT

An amphibious vehicle is disclosed. The vehicle includes a land motive device and a marine motive device. An engine is positioned within the vehicle to provide power to the land motive device and the marine motive device. A directing device operatively connected to the engine directs engine power selectively to one of the land motive device, the marine motive device, and the combination of the land motive device and the marine motive device. An engine management arrangement defines sets of various engine operating parameters. One set determines engine operation when the engine power is directed to the land motive device. Another determines engine operation when the engine power is directed solely to the marine motive device. An operator actuable control arrangement is also included that has a steering wheel and a brake pedal usable by an operator to control the vehicle both when it is in a land motive configuration and when it is in a marine motive configuration.

16 Claims, 19 Drawing Sheets

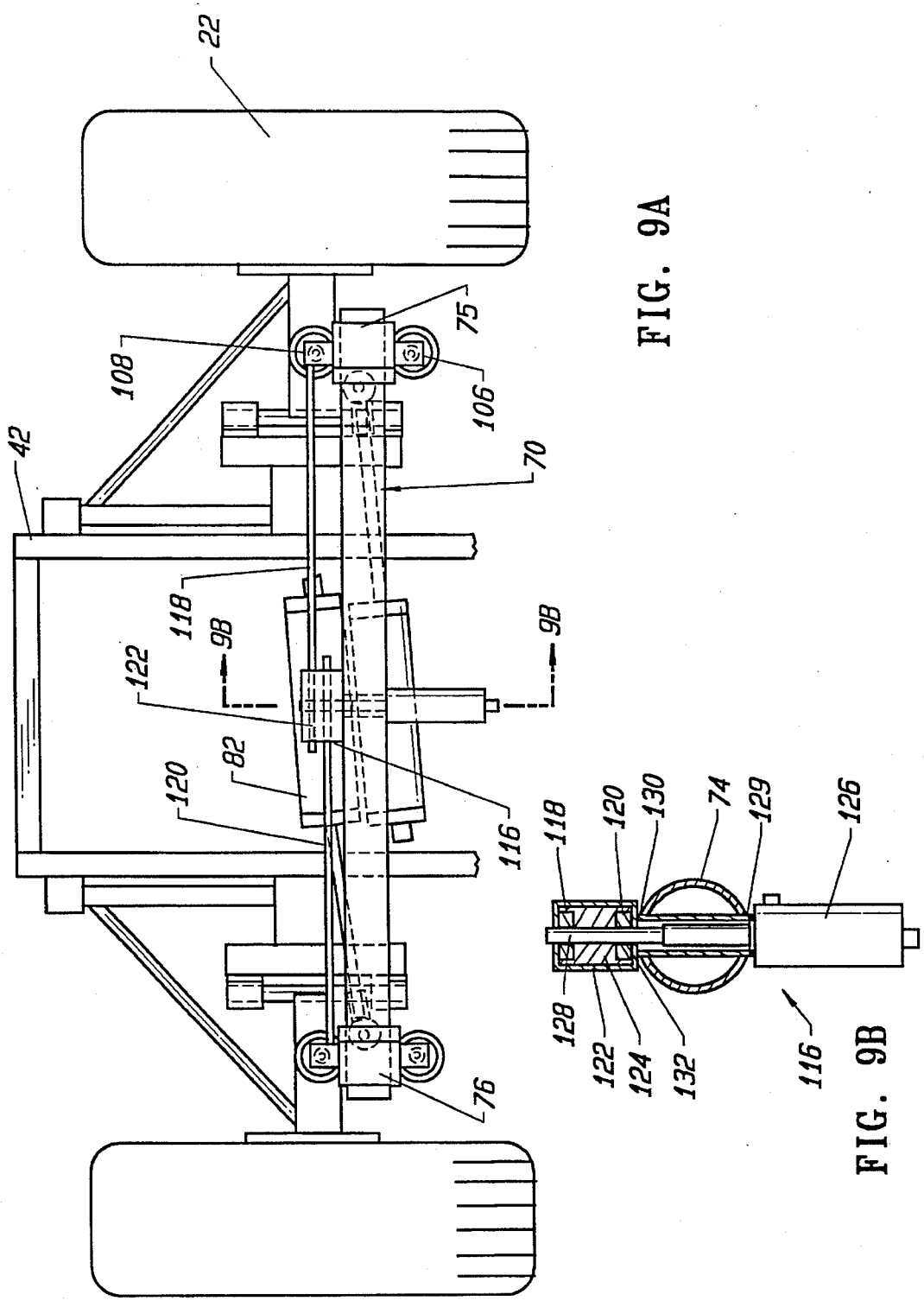

AMPHIBIOUS VEHICLE

This application is a divisional of patent application Ser. No. 08/384,461 filed Jan. 31, 1995 which, in turn, is a continuation of patent application Ser. No. 08/080,641 filed Jun. 21, 1993 (now abandoned), an application that was a continuation of abandoned patent application Ser. No. 902,660 filed Jun. 23, 1992.

BACKGROUND OF THE INVENTION

In general, the present invention relates to an amphibious vehicle. More particularly, the present invention relates to a vehicle which may be adjusted for land operation and marine operation.

Designed to operate both on land and in water, amphibious vehicles have been developed over the years. All previous attempts to mass produce such vehicles have failed because they centered around adapting, modifying, or augmenting vehicles originally designed for either land or water. For example, the attempts have included modifying an ordinary car, truck or military platform in an attempt to produce a seaworthy vehicle. The modified car or truck, while providing a vehicle which may be used both on land and in water, included several limitations which reduce the effectiveness of the vehicle during marine operation. The modified military vehicles were constructed using hardware which provided an amphibious vehicle more suitable to marine operation than land.

U.S. Pat. No. 3,903,831 discloses an amphibious vehicle which may function as a motor home on land and as a houseboat on water. The disclosed vehicle includes retractable wheels and a slidable hatch panel for covering the rear wheels. The vehicle is converted from land operation to marine operation by driving the vehicle into the water and manually shifting into a neutral gear, inserting a key and unlocking the wheels, engaging a switch to raise the wheels, and turning the key to lock the wheels in the raised position. An outboard prop powers the vehicle during marine operation.

The disclosed vehicle may be converted between land and marine operation. However, the process is both manually intensive and substantially time consuming. The operator must first drive into the water until the vehicle floats, and then interrupt forward progress to shift gears and raise and lock the suspension. The steps must be repeated in reverse to convert the vehicle from marine operation to vehicle operation.

The sliding hatch covers are included for streamlining the hull and covering the rear wheels. While designed to improve buoyancy of the vehicle, the covers are prone to debris contamination and impact misalignment, substantially reducing the effectiveness of the covers. Further, the design and weight of the drive and suspension system yield a vehicle which is expensive to manufacture, has high maintenance costs, and limited economy and maneuverability. Thus, the disclosed amphibious vehicle includes several features which substantially detract from the buoyancy of the vehicle, reducing efficiency and safety during marine operation.

Another amphibious vehicle is disclosed in U.S. Pat. No. 4,958,584. The disclosed vehicle includes a retractable suspension and a sliding hull section for covering the retracted wheels. The disclosed vehicle is essentially a modification of a standard land vehicle, reducing the effectiveness of the performance of the vehicle during marine operation. The design of the hull renders the vehicle unreliable during travel in rough water or unexpected storm conditions. Further, utilizing a sliding hull for sealing the vehicle against water intrusion risks debris contamination and impact misalignment. Debris contamination and impact misalignment substantially reduce the efficiency of providing a positive seal, seriously compromising seaworthiness.

The disclosed vehicle provides an amphibious vehicle; however, the design and weight of the front suspension and drive system yields a vehicle that is too front heavy to take advantage of any planing hull design, seriously limiting top marine speed and maneuverability. The mechanism for suspension retraction is extremely complicated, increasing the cost of manufacture and maintenance. Further, the retraction does not include a positive locking mechanism or other fail-safe devices to prevent improper suspension retraction when operating the vehicle on land.

The vehicles disclosed in the prior art each provide an amphibious vehicle which may be converted between land operation and marine operation. However, an amphibious vehicle providing substantially efficient and safe operation on both land and water is desirable. A vehicle which may be conveniently and efficiently converted between land operation and marine operation is additionally desirable. A vehicle which is designed to withstand rough marine conditions is also desirable. A vehicle which may be automatically converted between land operation and marine operation is similarly desirable. Additionally, a vehicle which is operated using the same controls during land and marine operation is desirable.

SUMMARY OF THE INVENTION

The present invention provides an amphibious vehicle which may be efficiently converted for effectively operating either on land or water. The vehicle includes many different features responsible for its efficacy. In one aspect, the present invention includes a land motive device and a marine motive device, and an engine for providing power to the land and marine motive devices. A directing device selectively provides engine power to one of the land motive device, the marine motive device, and the combination of the land and marine motive devices. An engine management arrangement defines a pair (two sets) of various engine operating parameters to one another, with one defining engine operation when engine power is directed to the land motive device, and the other defining operation when engine power is directed to the marine motive device.

In another aspect of the present invention, the vehicle includes an operator actuable switch for shifting between land operation and marine operation. By activating the switch, the operator initializes the conversion of the vehicle between land operation and marine operation. The vehicle further includes a pressure sensing device for detecting the production of thrust by the marine motive device. When an operator activates the marine mode, and the pressure sensing device detects the production of sufficient thrust to impart motion to the vehicle, the engine power is automatically directed solely to the marine motive device.

An additional aspect of the present invention includes an operator actuable control for operation of the vehicle which is the same when engine power is directed to the land motive device as when the engine power is directed to the marine motive device. The control includes a vehicle guiding device, which is adjustable between a land configuration and a marine configuration. The guiding device may be secured in at least one of the land configuration and the marine configuration to prevent unintended adjustment during operation of the vehicle. To reduce vehicle speed during land and marine operation, the control also includes a speed reducing device adjustable between a land configuration and a marine configuration.

In another aspect, the present invention includes a method for converting the vehicle between a land configuration for land operation and a marine configuration for marine operation. To convert the vehicle from land to marine operation, the method includes the steps of manually activating an operator actuable switch to shift the vehicle to marine operation and guiding the vehicle into a body of water. The method further includes automatically directing engine power to the combination of the land motive device and the marine motive device, determining entrance of the vehicle into the body of water, and automatically directing engine power only to said marine motive means.

To convert the vehicle from marine operation to land operation, the method includes the steps of manually activating an operator actuable switch to initiate shifting the vehicle to the land configuration and automatically directing the engine power to the combination of the land motive device and the marine motive device. The method further includes manually guiding the vehicle from the body of water, automatically determining the egress of the vehicle from the water, and automatically directing the engine power solely to the land motive device.

The amphibious vehicle of the present invention has several advantages. After the operator activates a switch, the vehicle automatically shifts between land operation and marine operation. Operation of the vehicle is continued during the transition between land and marine operation, allowing the vehicle to be driven or propelled forward during the conversion. The vehicle is designed for effective operation both on land and in the water, and includes various safety features preventing unintentional conversion between land and marine modes. Additional features and advantages of the present invention will be more readily apparent from the following detailed description when taken in conjunction with the included drawings.

BRIEF DESCRIPTION OF THE DRAWINGS

FIG. 9A depicts a top plan view of the front suspension and suspension retraction system of FIG. 7.

FIG. 9B depicts a cross sectional view taken along line 9—9 of FIG. 9A, showing the secondary securement system.

DETAILED DESCRIPTION OF THE PREFERRED EMBODIMENTS

Figure 1:
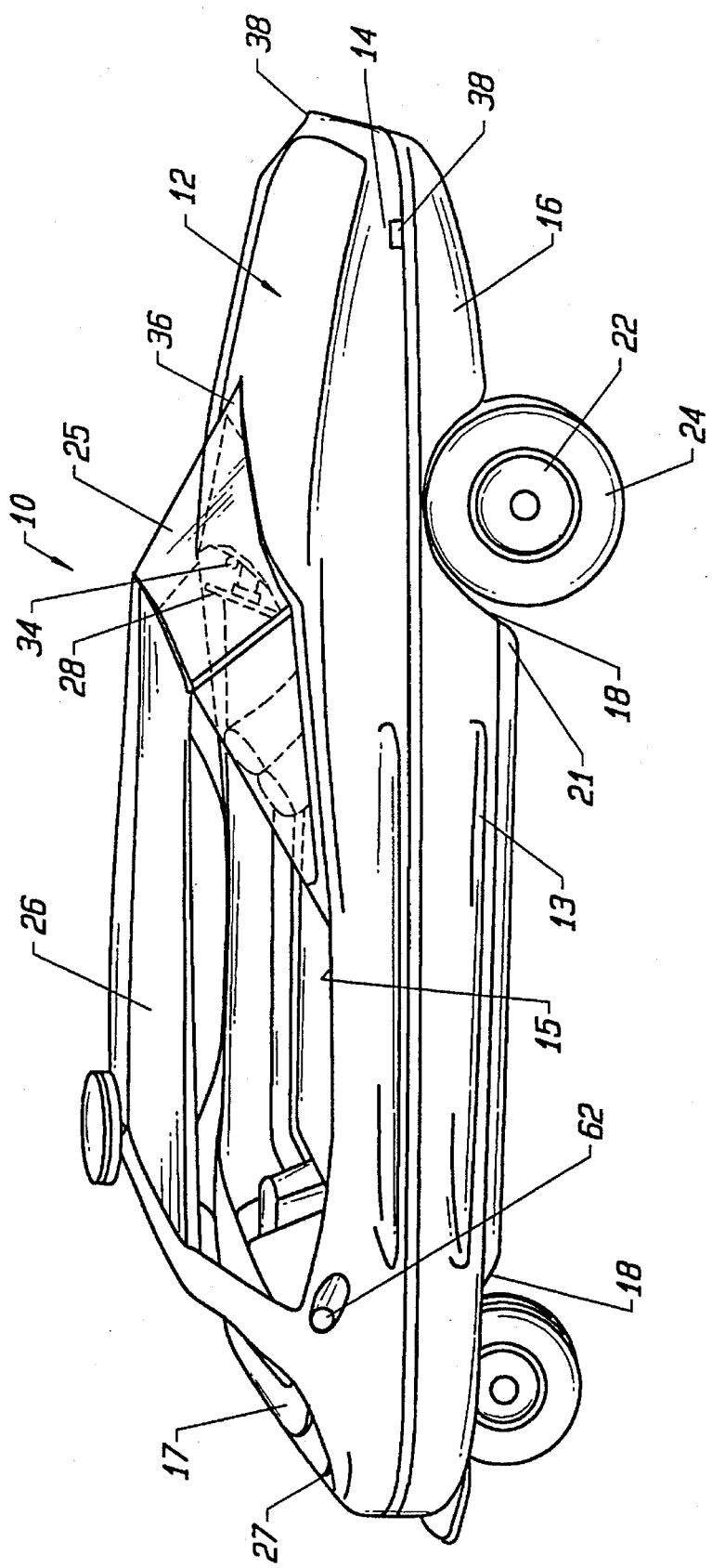
FIG. 1 depicts a perspective view of an amphibious vehicle designed in accordance with the present invention, shown with the wheels in the lowered position.

Reference will now be made in detail to the preferred embodiments of the invention illustrated in the accompanying figures. Turning now to the drawings, wherein like components are designated by like reference numerals throughout the various figures, attention is first directed to FIGS. 1–4.

An amphibious vehicle 10 designed in accordance with the present invention to provide a mode of transportation which may be efficiently utilized for both land operation and marine operation is shown in FIGS. 1 to 4. Vehicle 10 includes a substantially buoyant body portion 12 having upper and lower hull portions 14 and 16. In the preferred form, the hull portions 14 and 16 are separately formed of a buoyant, composite material, and then bonded together to yield an integral hull. The lower hull portion 16 includes a plurality of openings 18 generally formed substantially above the waterline 20, indicated in interrupted lines in FIG. 2. Each one of a plurality of wheels 22 extends through an associated one of openings 18 for supporting and driving the vehicle during land operation. The wheels are movable between two positions; a lowered position for land operation, shown in FIGS. 1 and 2, and a raised position for marine operation, shown in FIG. 3. When in the raised position, the wheels 22 are substantially above the waterline 20.

Figure 10A:
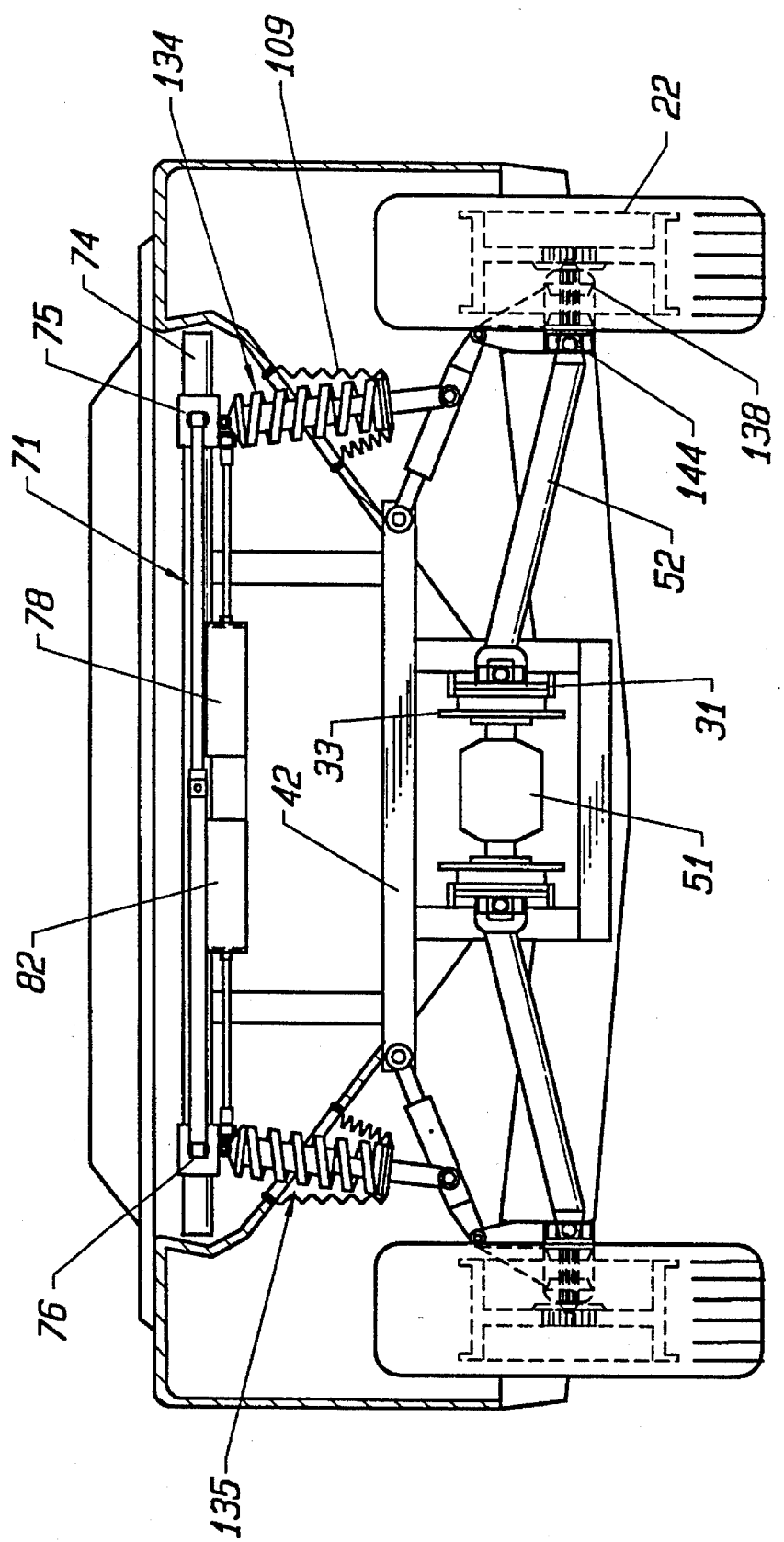
FIG. 10A depicts a rear elevational view of the rear suspension and suspension retraction system of the amphibious vehicle of FIG. 1, shown with the wheels in a lowered position.
Figure 10B:
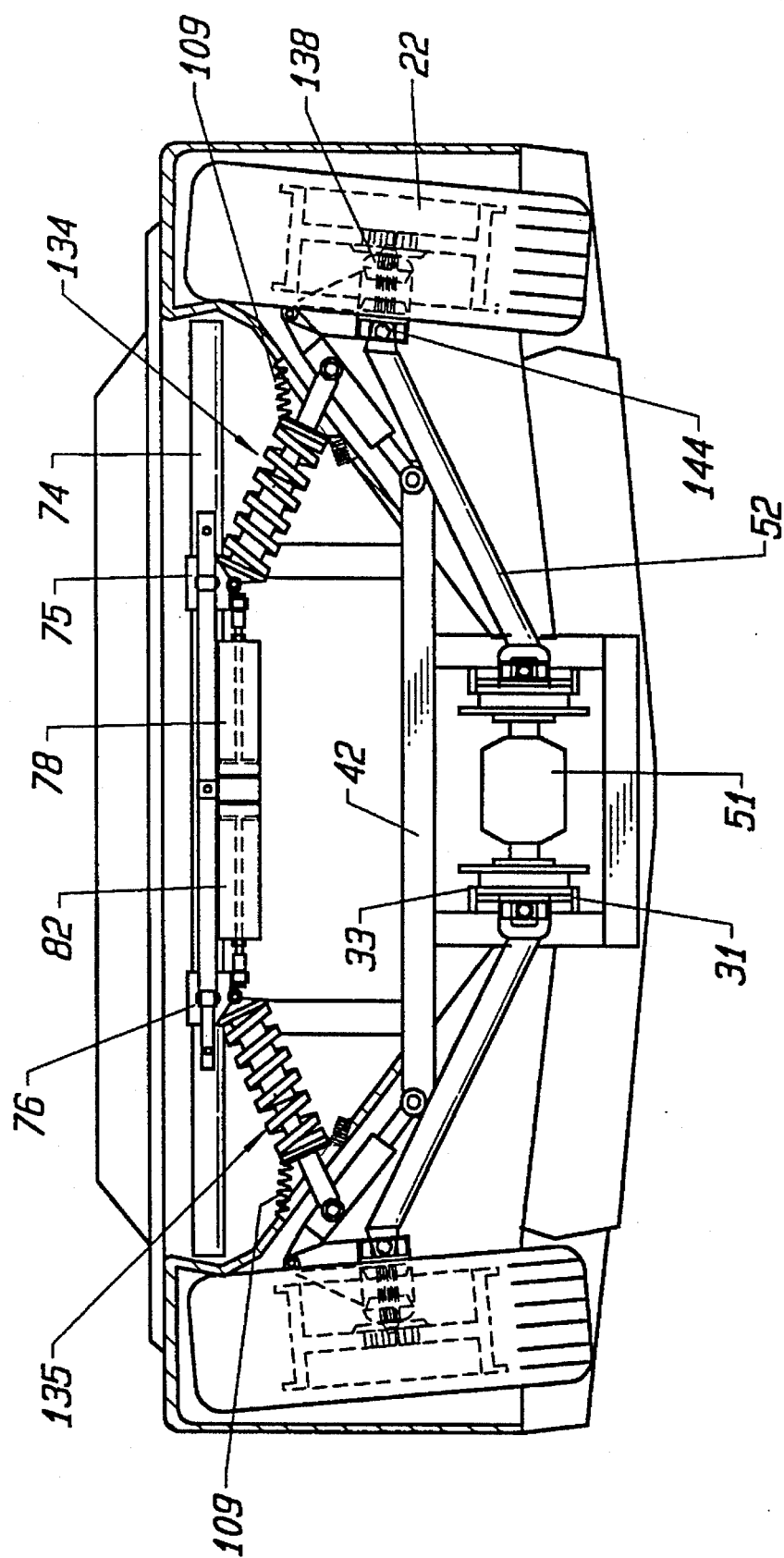
FIG. 10B depicts a rear elevational view of the rear suspension and suspension retraction system of FIG. 10A, shown with the wheels in a raised position.

A ground engaging tire 24 is mounted on each wheel 22, and is formed with a resilient exterior side surface. As is shown particularly in FIG. 8, when the wheels have been moved to the raised position, the side surface of tire 24 engages the exterior of lower hull 16 surrounding a portion of opening 18, generally indicated at 19. The interengagement between front tires 24 and lower hull portion 16 form a primary seal. Bellow seals, discussed below in relation to FIGS. 7 to 10B, are also preferably included to prevent water from entering the interior of the vehicle. Two split lip seals 31 and 33 are provided at the rear opening 18 (FIGS. 10A and 10B). In the preferred form, a hydrophobic substance such as grease is included between seals 31 and 33. The seals 31 and 33 are oriented to obstruct water from entering the interior drive area of the vehicle, while allowing excess grease to exit from the seals. The split lip seals and the interengagement between tire 24 and lower hull portion 16 provide a primary seal at the rear wheel openings.

Since the openings are positioned above the waterline 20, the vehicle is substantially protected from the seepage of water into the interior. The primary seal formed at each opening 18 substantially prevents splashed water from entering the vehicle during marine operation. The interengagement between the hull portion and the tire surface and the provision of split lip seals 31 and 33 form a substantially water tight seal without requiring other modifications of the vehicle during operation. The design of the tire and hull provides a wedged shape area, generally indicated at 21, which forces debris and mud away from the wheels to prevent potential interference with the primary seal. The design of the hull, and the utilization of the wheels and the split lip seals to form a primary seal, provides an effective and efficient streamlined hull for marine operation.

Although not shown, the vehicle may include a secondary sealing system, for example a sealing boot mounted to the interior of hull portion 14 to substantially surround opening 18. One or more bilge pumps, well known in the art, may further be included within the vehicle to remove any water leaking through the primary seal formed between the tire and the hull portion. In the preferred form, the vehicle 10 is divided into three separate compartments, each having a bilge pump operational in both land and marine modes. By positioning the secondary sealing system in the interior of the vehicle, the streamlined design of the hull remains intact.

When the wheels are raised, seating against the hull, front tires 24 have the additional advantage of providing a protective bumper. When docking the vehicle, or if the vehicle encounters a large rock or other protrusion, the tire will accept the force of the blow. Thus, if the vehicle contacts the obstacle from the proper orientation, damage to body portion 12 is substantially prevented by the front tires. Also, since the tires seat against the lower hull portion 16, the force of impact is isolated from the suspension and steering components.

Figure 2:
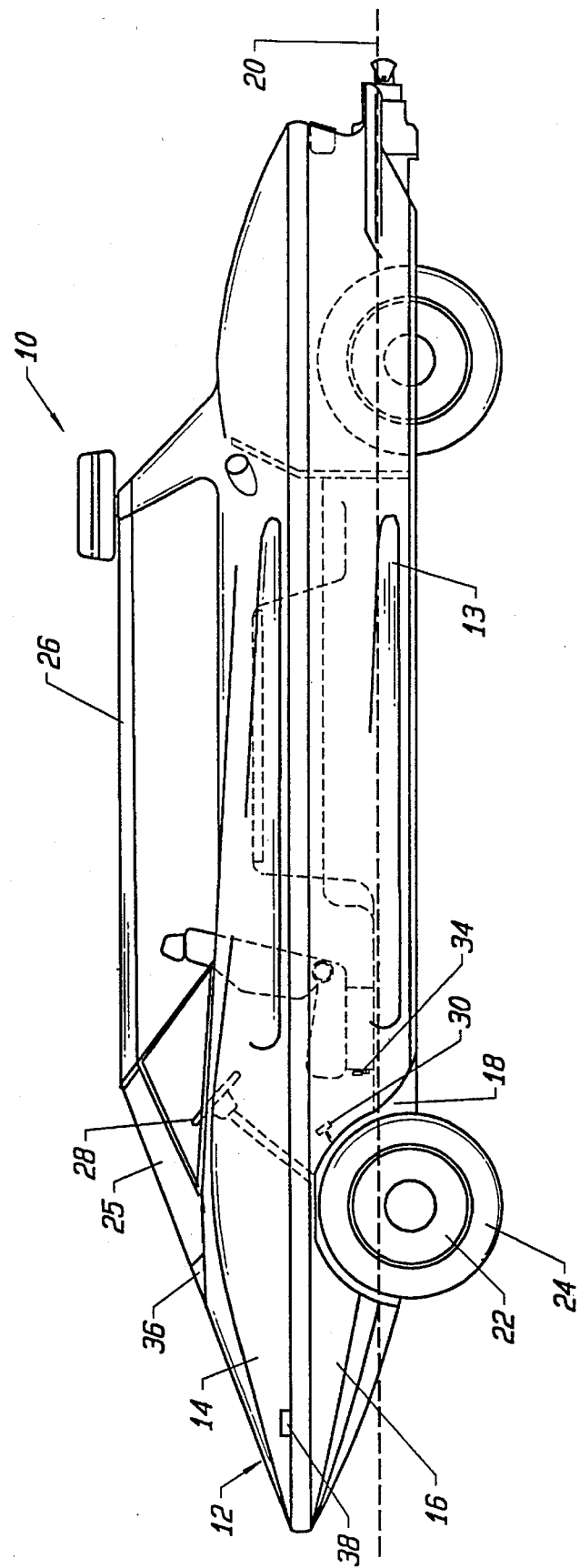
FIG. 2 depicts a side elevational view of the amphibious vehicle of FIG. 1.
Figure 3:
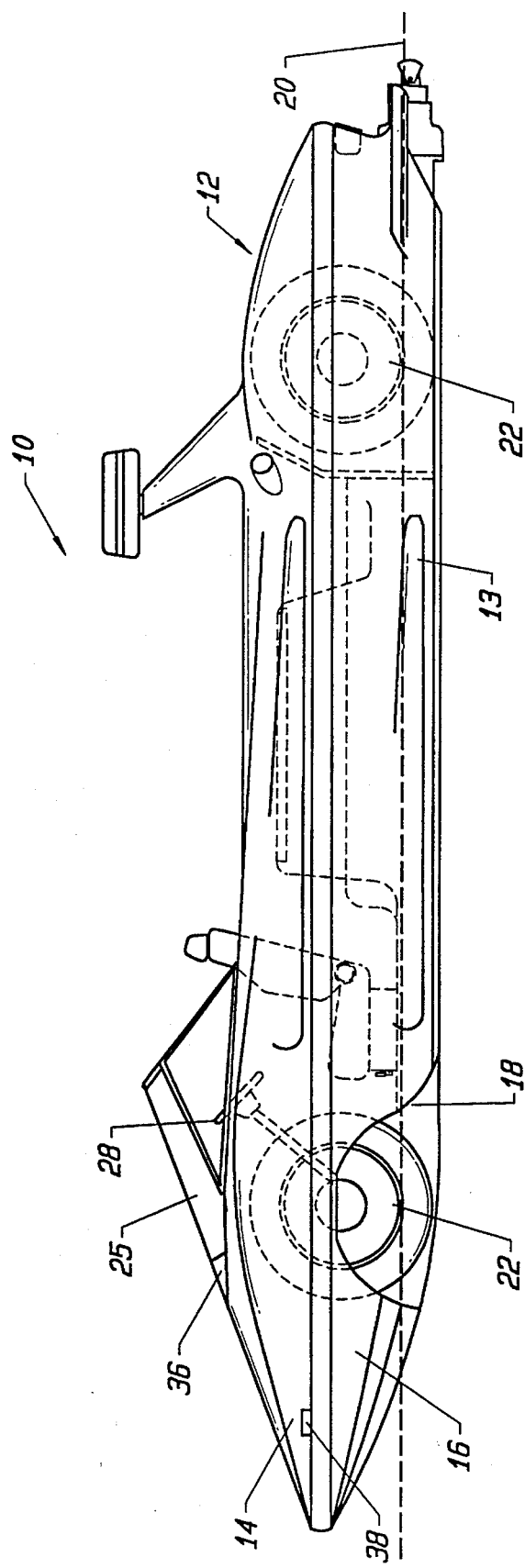
FIG. 3 depicts a side elevational view of the amphibious vehicle of FIG. 1, shown with the wheels in the raised position and the top portion removed.

In the preferred form, vehicle 10 includes a removable top portion 26, shown particularly in FIGS. 1 and 2. If desired, the operator may conveniently remove top portion 26 so that the vehicle conforms to the showing in FIG. 3. As can be seen particularly in FIG. 1, the vehicle is not formed with side doors. Rather, body portion 12 is formed as an integral hull and includes slip-resistant steps 13 enabling the operator to conveniently enter or leave the vehicle. Handles 15 are formed along the interior rim of lower hull portion 16 and may be gripped by the operator when entering or exiting the vehicle. The front windshield 25 is manufactured from safety glass having a polarized ultra-violet radiation filter coating, and is configured to provide a high degree of self water shedding when the vehicle is operating at high speeds. A hinged rear deck 27 provides access to the major components of the vehicle drive system. In the preferred form, hinged deck 27 includes a plurality of slip resistent steps 17, providing access to the vehicle.

The interior of the vehicle, partially shown in FIG. 1, substantially resembles the interior of a standard car. Passenger seating is arranged in relation to the other components of the vehicle to provide ideal front to rear weight distribution while maximizing passenger seating. As with the standard vehicle, the style and appearance of the interior of the vehicle may be modified in accordance with personal preference. Similarly, the design of the upper hull portion 14 may be modified in style and size.

Various operator controls, for example a manually actuable steering instrument or steering wheel 28 and a manually actuable braking instrument or brake pedal 30 (FIG. 2) are included for controlling operation of the vehicle. With the present invention, the operator uses the controls to manipulate the vehicle while in both the land and marine modes. The controls have various controlling positions which provide the same type of effect irrespective of whether the vehicle is operating on land or in water. Specifically, the operator rotates the steering wheel and depresses the brake pedal when driving the vehicle during either land or marine operation. This eliminates the necessity for separate control systems, each suitable only for use during one mode of operation. A single control system significantly simplifies operation of the vehicle, and enhances the appearance of the vehicle interior.

In addition to the steering and brake controls, the vehicle 10 includes an operator actuable switch 34 for shifting between land operation and marine operation. With the present invention, the operator need only activate switch 34 and continue driving the vehicle. The vehicle automatically is converted between the land and marine modes without further input from the operator. The actual conversion of the vehicle is discussed in more detail below.

Vehicle 10 is fully equipped for operation on both land and water. The vehicle includes a dual horn system, with a standard land horn enabled when in the land configuration and a marine horn enabled during the marine mode. The speedometer is functional in both land and marine modes. Body portion 12 includes marine running lights 36, as well as headlights, side marker lights, turn indicators, and braking lights, generally indicated at 38. During land operation, the headlights, side marker lights, turn indicators, braking lights and reverse direction lights may be operated as with a standard vehicle. When in the marine mode, the brake lights are disabled, with the reverse direction lights being illuminated when the operator depresses the brake pedal to slow the vehicle, and the headlights function as the vehicle's docking lights. The illumination controls are automatically adjusted between a marine light configuration, with the marine lights enabled during marine operation, and a land light configuration, with the standard land lights enabled during operation in the land mode, as is discussed in more detail below.

The vehicle 10 includes dual baffled safety fuel cells (not shown) located near the outer periphery of the vehicle. The fuel cells are constructed from a fuel resistant material, and include integral baffles that resist movement of the fuel in response to vehicle motion. The cells are further designed to deform rather than rupture on impact. A balance tube (not shown) connects the fuel cells together, maintaining each with an equal level of fuel and allowing both to be filled from a single source. One or more conventional dual marine fuel pumps (not shown) are connected to the fuel cells to supply the required fuel for operating the vehicle.

Figure 5:
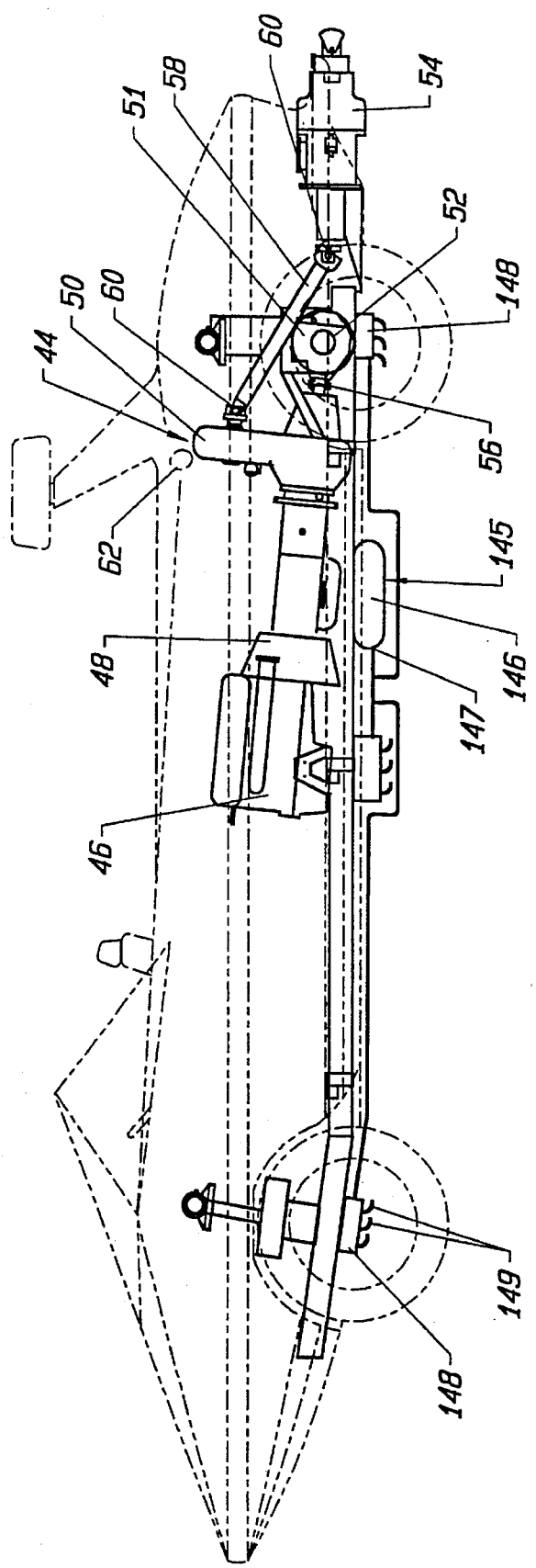
FIG. 5 depicts a side elevational view of the drive system components of the amphibious vehicle of FIG. 1.
Figure 6:
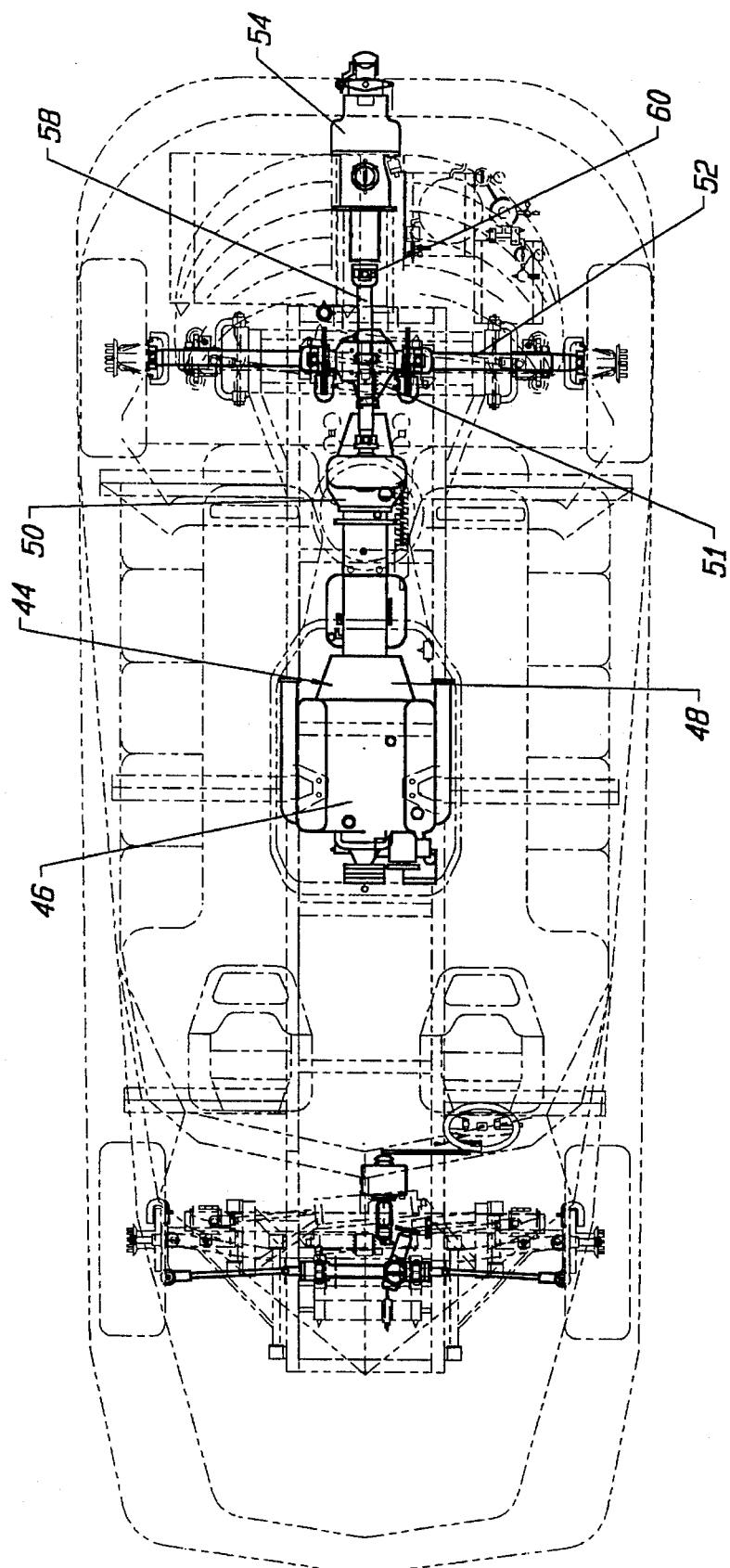
FIG. 6 depicts a top plan view of the drive system components of FIG. 5.
Figure 7:
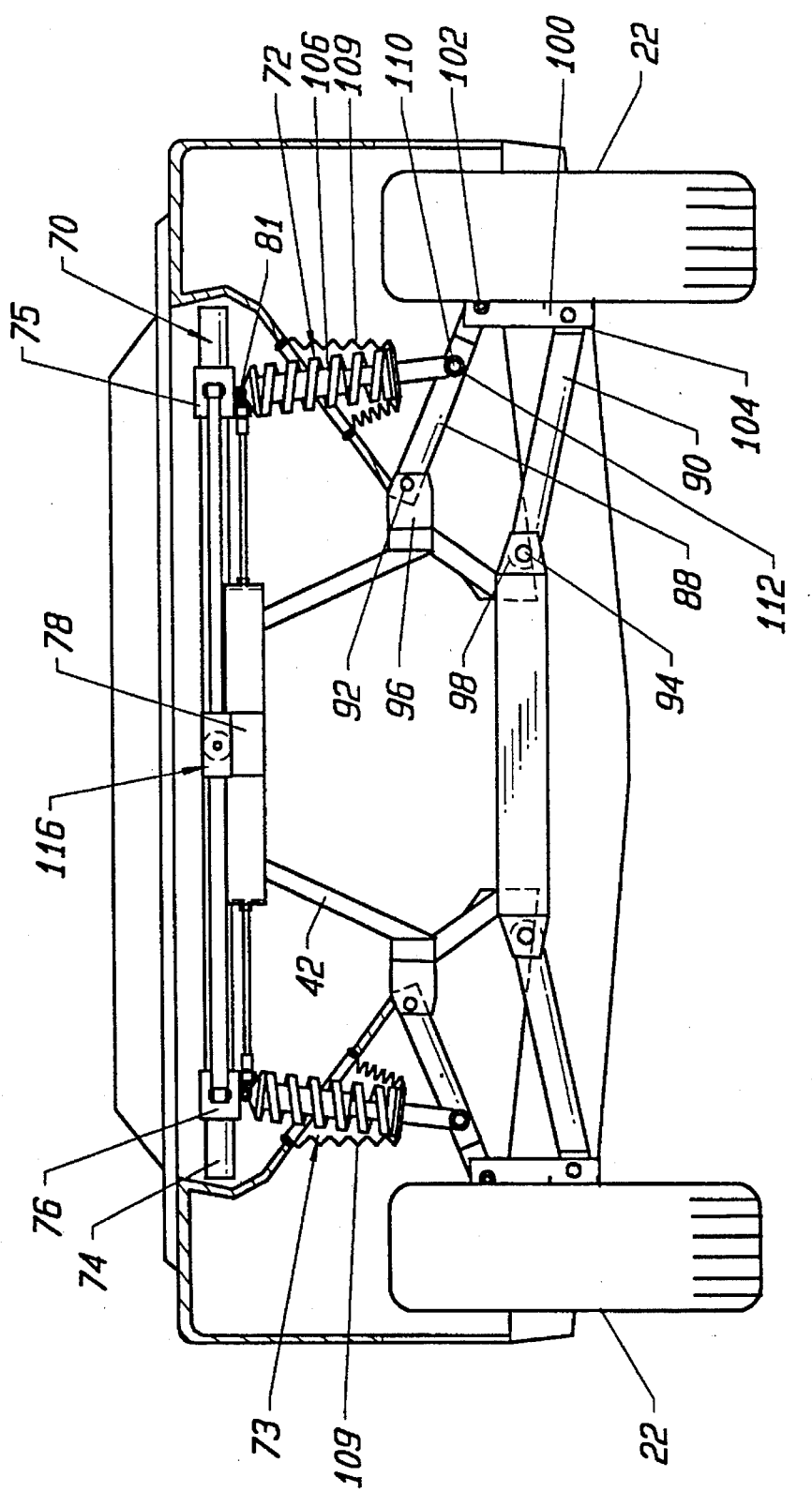
FIG. 7 depicts a rear elevational view of the front suspension and suspension retraction system of the amphibious vehicle of FIG. 1, shown with the wheels in a lowered position.
Figure 8:
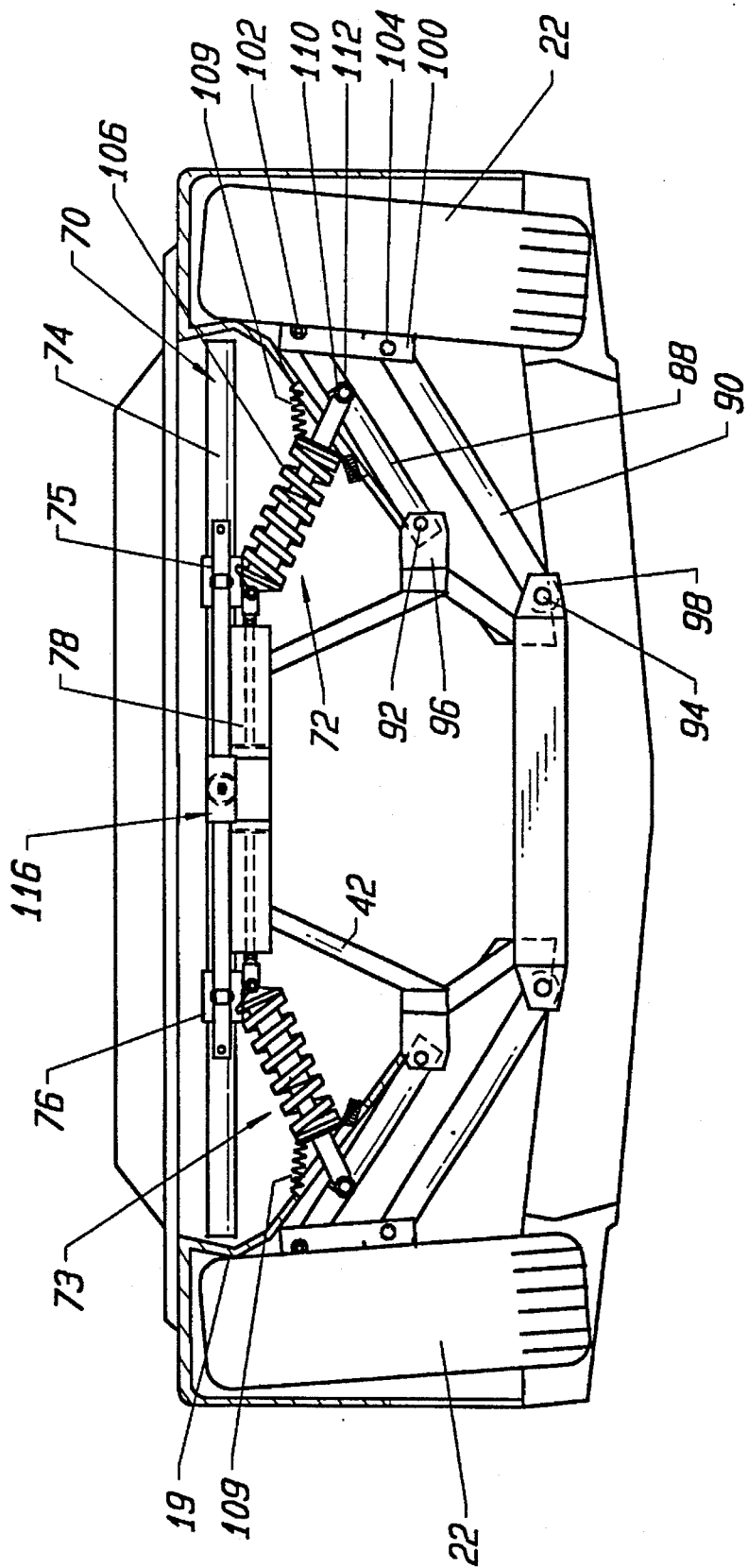
FIG. 8 depicts a rear elevational view of the front suspension and suspension retraction system of FIG. 7, shown with the wheels in a raised position.

The drive system of the amphibious vehicle 10 of the present invention is shown in FIGS. 5 and 6. Drive system 44 includes a conventional internal combustion engine 46 and a conventional, multi-speed automatic transmission 48 for providing power while in both the land and marine modes. A variety of commercially available engines and transmissions may be used, for example one of the current 3.6, 5.0, 5.8 and 7.6 liter standard and high output Ford marine compatible engines and a compatible truck automatic transmission may be selected. The engine 46 and transmission 48 are connected to provide power to means for providing land motive force, such as a final land drive 51 and a rear wheel drive shaft 52, and means for providing marine motive force, such as a marine drive or marine jet pump 54.

An electronic engine management arrangement or unit 47 (FIG. 16) is electrically connected to engine 46 to control operation of the engine, ensuring the engine is operated at peak efficiency near the ideal air to fuel ratio of 14.7 to one. The engine management unit defines two sets of various engine operating parameters. One of the set determines engine operation during land operation of the vehicle and during the transition between the land and marine modes. The other set determines engine operation when the vehicle is in the marine mode. When cruising at moderate to high speeds in the marine mode, the marine jet drive power requirements are nearly directly proportional to the rate of vehicle speed. During operation on land, the rear wheel power requirements are related to several variables. The engine management unit adapts the management of the engine to either land or marine operation, depending upon the mode of vehicle 10. The vehicle of the present invention additionally includes a conventional cruise control system (not shown), modified to function at all speeds when the vehicle is in the marine mode.

Drive system 44 further includes means for directing engine power to the land motive device, the marine motive device or the combination of the land and marine motive devices. One example of such directing means is provided by a final drive selector 50 which directs engine power to the rear wheel drive shaft 52 to drive the vehicle when on land, and to the marine jet pump 54 to propel the vehicle when on water. During transitions between the land and marine modes, the final drive selector directs engine power simultaneously to drive shaft 52 and the jet pump. When converting the vehicle from the land mode to the marine mode, drive selector 50 will supply power to both the rear wheel drive shaft and the jet pump until the marine drive 54 has produced a minimum level of pressure for a minimum amount of time. During the marine-to-land transition, power is supplied to both drive shaft 52 and the jet pump until marine drive 54 fails to produce the minimum level of pressure.

In the present embodiment, final drive selector 50 is provided by a split drive transfer case which transfers one input, the engine power, to two outputs, drive shaft 52 and jet pump 54. The final drive selector is coupled to final land drive 51 through universal joint 56. A marine drive shaft 58 couples drive selector 50 to the marine drive 54 through a pair of universal joints 60. During operation, the final drive selector will direct engine power solely to drive shaft 52, solely to marine drive shaft 58, or to the two drive shafts simultaneously. Thus, the engine drives the vehicle during land operation and marine operation, and during the transition therebetween.

The components of drive system 44 are mounted to vehicle frame 42 using vibration dampening mounts to provide smooth vehicle operation. The center of gravity of the drive system is below the horizontal centerline of vehicle 10. The weight distribution provided by the positioning of the drive system ensures the vehicle will tend to be self-righting if inverted during marine operation.

Figure 4:
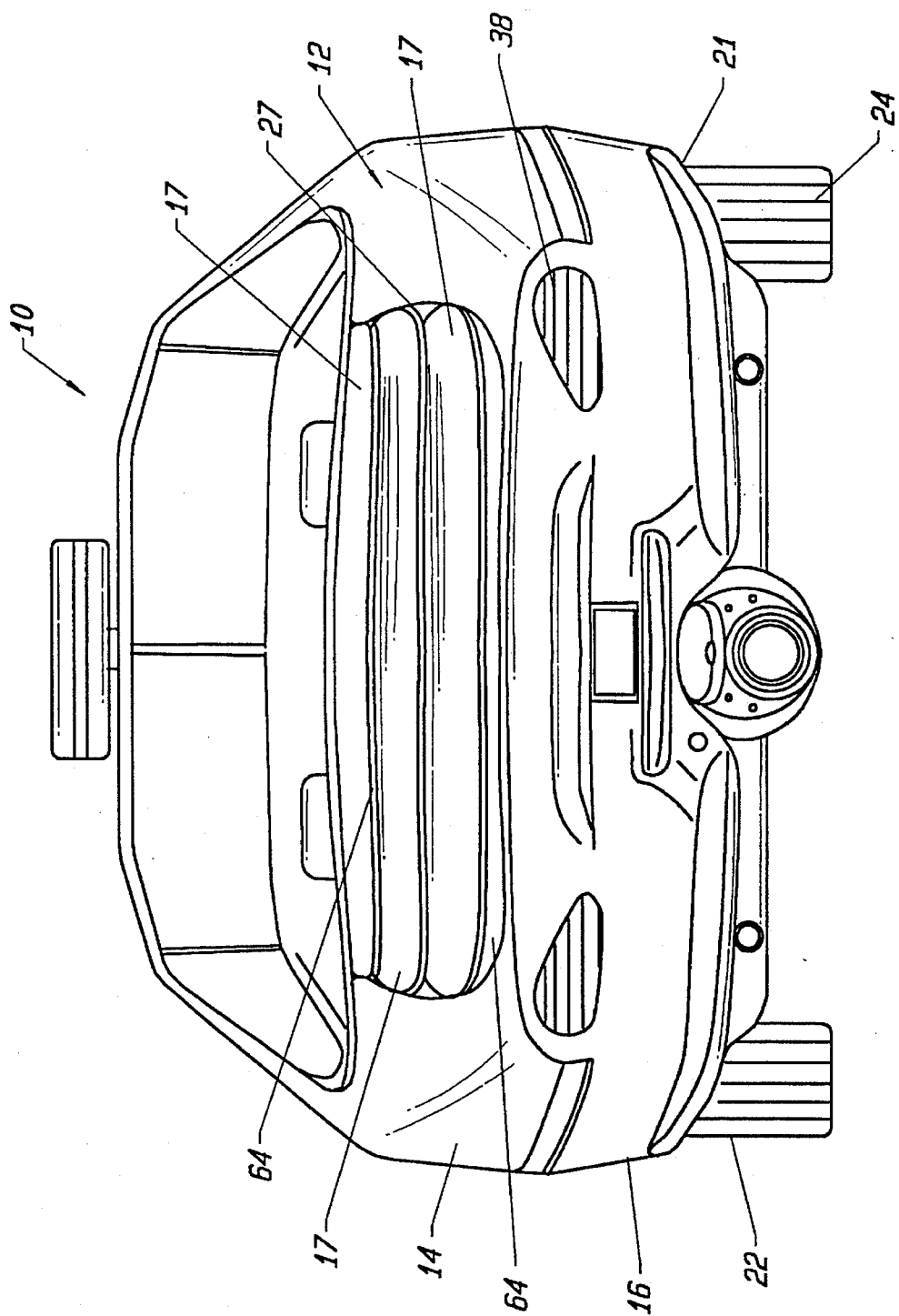
FIG. 4 depicts a rear elevational view of the amphibious vehicle of FIG. 1.

Drive system 44 is contained within a substantially enclosed area positioned below hinged deck 27 (FIG. 4). To maintain an acceptable operating temperature for the drive system and to remove combustible gases from the drive system, vehicle 10 includes means for circulating air through the drive system area. One example of such air circulating means includes an air inlet duct 62 formed in upper hull portion 14 on either side of the vehicle and an air outlet duct 64 formed at the rear of body portion 12 between steps 17 (FIGS. 1 and 4). The air inlet and outlet ducts are positioned to take advantage of the areas of high pressure and low pressure generated around body portion 12 during operation of the vehicle. Air is circulated in a path traveling through inlet duct 62, into the drive train area, through external fluid cooling radiators (not shown) mounted to the underside of the hinged rear deck 27, and exiting from the vehicle through air outlet duct 64. The circulation of air supplies intake air to engine 46, removes heat generated by drive system 44, purges the drive system area of combustible gases, and provides the external air cooling radiators with air. A flammable gas detecting device is included within the drive system area. The detecting device alerts the operator to the present of combustible gases. In the preferred form, the detecting device is electrically connected to prevent ignition of the vehicle 10 until the drive system area is free of flammable gases.

The air circulation system of the present invention may additionally include a conventional water separator (not shown) positioned within the vehicle adjacent the entrance of inlet duct 62 to remove excess water from the air entering the vehicle. Additionally, an electric air fan (not shown) may be included near the inlet air ducts to ensure the constant circulation of air through the drive train area when the vehicle is operating at low speeds or is stationary. In addition to the air circulation system, vehicle 10 includes several additional conventional methods, not shown, of maintaining an acceptable drive system operating temperature. For example, the engine includes a water cooling system, an oil cooling system, and a water/oil heat exchanger for maintaining a minimum differential between engine water and engine oil temperatures. An external radiator is utilized with both the water cooling system and the oil cooling system. The transmission includes a fluid cooler, while a thermal barrier on the inside of the drive train cover reduces the temperature on the exterior surface. Exhaust and cooling pipes similarly have a thermal barrier wrap to reduce the temperature of the drive system area.

Turning to FIGS. 7 through 10B, the retractable suspensions of the present invention will be described in detail. Front and rear wheels 22 are mounted to front and rear retractable suspension assemblies 70 and 71 respectively. The components of the suspension assemblies 70 and 71 will initially be described in relation to the front suspension assembly 70, shown in FIG. 8. Suspension assembly 70 includes fully independent suspensions 72 and 73, to which the front wheels 22 are mounted. As is discussed in more detail below, the independent suspensions are automatically retractable. A suspension frame rod 74 mounted to the vehicle frame 42 generally extends across the width of the vehicle. The suspensions 72 and 73 are each secured to a respective collar and bushing 75 and 76 slidably mounted to the frame rod. Each collar is formed with an internal diameter dimensioned to fit around the diameter of the frame rod 74, thereby allowing the bushings to slide along the length of the frame rod. The collars and frame rod 74 provide means for retracting suspensions 72 and 73. The suspension assembly 70 is preferably electrically isolated to prevent electrolysis when in contact with water.

With the retraction assembly of the present invention, suspensions 72 and 73 may be retracted by simply moving collars 75 and 76 to an extreme inward position, and extended by moving the collars to an extreme outward position. A double acting, pneumatic ram 78 is pivotally attached to the underside of frame rod 74 to move suspension 72 between the retracted and extended positions. The ram is pivotably attached to collar 75 by retaining nut 80. The double acting ram alternatively exerts a pulling force and a pushing force to slide the collar 75 between the extreme inside and extreme outside positions. A substantially similar pneumatic ram 82 (FIG. 9A) is included to retract suspension 73. It is to be understood that pneumatic ram 82 operates in a manner substantially similar to that of pneumatic ram 78.

In the present embodiment, the components of suspension 72 are substantially similar to, and reversed relative to, suspension 73. Therefore, only suspension 72 will be described in detail. Suspension 72 includes upper and lower A-arms 88 and 90 pivotably mounted to vehicle frame 42 for movement about a horizontal axis. The upper and lower A-arms are secured to vehicle frame 42 by way of mounting bushings 92 and 94 provided on the proximate ends of the upper and lower A-arms. Bushings 92 and 94 are pivotally mounted on mounting adapters 96 and 98 which are bolted or otherwise secured to the vehicle frame 42. The upper arm is designed to carry vertical torque loads imparted on suspension 72, while the lower arm is designed to carry horizontal torque loads. A steering knuckle 100 is pivotably mounted for movement about an essentially vertical axis to the distal ends of upper and lower arms 88 and 90 through upper and lower ball joints 102 and 104.

The suspension 72 includes a dual coil and shock absorber 106 and 108 for providing acceptable riding conditions when the vehicle is driven on land, and allowing for retraction of the suspension for operating the vehicle in the water. A permanently sealed ball bearing 110 is provided at either end of the shock absorbers 106 and 108 to provide smooth, even suspension positioning. The shock absorbers are mounted to collar 75 and upper arm 88 by nut and bolt assemblies 112. When pneumatic ram 78 moves collar 75 along the frame rod toward the extreme inside, the upper A-arm is pulled upwardly by the dual shock absorber 106 and 108, thereby moving the suspension to a fully retracted position. Wheel 22 is raised substantially above the waterline, and tire 24 seats against and partially seals with the exterior of lower hull portion 16 for marine operation. When the pneumatic ram 78 pushes the collar to an extreme outside position, the upper A-arm is pushed downward moving the suspension to an extended position. With the suspension fully extended, wheel 22 is in the lowered position for land operation. Bellow seals 109 are provided on suspension 72 to partially form a seal preventing water from entering the interior of the vehicle. The bellow seals may be substituted by other sealing devices, such as rubber flaps, to prevent the seepage of water into the vehicle interior.

With the present invention, the wheels are raised and lowered by automatically moving the collars along the frame rod 74. The construction of the suspension is carefully designed to provide the wheels with the normal caster and camber angles when lowered for land operation, and to allow the wheels to seat against and partially seal with the hull when in the raised position.

Suspensions 72 and 73 are held in either the retracted position or the extended position by the operation of pneumatic rams 78 and 82. To prevent accidental retraction during land operation in the event the pneumatic rams fail, suspension retraction assembly 70 further includes means for securing the assembly in position. One example of such securing means is provided by a secondary securement device 116 shown in FIGS. 9A and 9B. Securement device 116 includes a pair of elongated slats 118 and 120 each having one end mounted in a pivotal fashion to a collar 75 and 76. The slats extend from the collars into a housing 122. An insulating member 124 within the housing separates slat 118 from slat 120. In the preferred form, the insulating member is I-shaped, having a channel formed for receiving each slat.

As the collar is moved along frame rod 74, the slats pass from opposite directions through housing 122 along a respective channel of the insulating member. The securement assembly further includes a double acting, pneumatic ram 126 having a machined pin 128 positioned to extend through apertures 129 formed in frame rod 74 and apertures 130 formed in the housing and insulating member 124. The slats 118 and 120 are formed with apertures 132 positioned for alignment with apertures 129 and 130 when the collars are moved to either the extreme inside or extreme outside position. When the suspension is either retracted or extended, the pneumatic ram pushes pin 128 through the aligned apertures 129, 130 and 132, securing the slats within the housing. If pneumatic ram 78 were to fail during operation, the interengagement between pin 128 and slats 118 and 120 would prevent retraction or extension of the suspension. Before manipulating the suspensions 72 and 73, the ram is activated pulling pin 128 from housing 120 and allowing the slats to move freely along the channels so that the collars can slide along frame rod 74. The pin 128 is machined such that, when the pin is fully engaged and under pressure, the slats, the housing and insulating member 124 are compressed together, preventing rattle during vehicle operation. If pressure fails, preventing extension of the pin 128, an internal spring pushes pin 128 outward.

Rear retractable suspension assembly 71 is shown in FIGS. 10A and 10B. The rear suspension assembly is substantially identical to suspension assembly 70, and includes independent suspensions 134 and 135. Suspension 134 is similar to front suspension 72, with the lower A-arm being replaced by rear wheel drive shaft 52. The rear wheel drive shaft extends from final land drive 51 to a rear drive hub 138 for powering the vehicle during land operation. The distal end of upper A-arm 136 is provided with pivot bearings 140 which are interference fit to mounting point 142 of rear drive hub 138. The rear wheel drive shaft 52 is mounted to rear wheel drive hub through universal joint 144. Rear wheel 22 and tire 24 is mounted to the exterior surface of rear wheel drive hub 138. When final drive selector 50 directs engine power to final land drive 51, the rear wheel drive shaft rotates wheel 22.

Rear wheel drive hub 138 is pivotably mounted for movement about an essentially horizontal axis to upper A-arm 136 and rear wheel drive shaft 52. Since the rear wheel drive shaft is utilized as the lower control arm of suspension 134, the position of drive shaft 52 is raised sufficiently to provide a high degree of vehicle ground clearance for entering and exiting the water. The construction of the suspension assembly 71 further provides for proper rear suspension angles in both the retracted and extended positions. Since suspension 134 is substantially similar, and reversed relative to, suspension 135, only suspension 134 is described in detail.

When the suspensions are being retracted or extended, critical moving components will be exposed to water.

Vehicle 10 includes means for filling the space between critical parts with a hydrophobic lubricant substance, such as an automatic greasing or lubricant system 145 which automatically lubricates the critical parts of the suspension systems 70 and 71 (FIG. 5). The lubricant system 145 includes a removable lubricating device or grease gun 146 having a pneumatically operated trigger 147. Activation of the lubricating device automatically injects a measured quantity of a hydrophobic lubricant to distribution blocks 148. The blocks 148 distribute a portion of a hydrophobic lubricant, such as grease or another synthetic or petroleum product, to the critical parts of the suspension through lines 149 extending from each block 148. To grease other parts of the vehicle, for example the front wheel bearings, the operator may remove the grease gun 146 and manually lubricate the desired components of the vehicle. In the preferred form, a warning light is included for indicating a low level of a hydrophobic lubricant in the lubricating device, and a space is provided for retaining spare cartridges filled with the hydrophobic lubricant. The lubricant system 145 is operated prior to each retraction or extension of the suspensions 72 and 73. Thus, the critical parts of the suspension which would otherwise be exposed to water are protected by a hydrophobic lubricant.

As is apparent from the foregoing description, the suspensions are automatically retracted and extended, shifting the vehicle between land and marine operation. By pneumatically converting the vehicle between land and marine modes, the suspensions may be effectively and reliably retracted. With the present invention, the construction of the suspension retraction assemblies 70 and 71 is simple and efficient. The simplicity substantially reduces construction and maintenance costs, making the vehicle 10 suitable for mass production. Further, the simplicity increases the operative life of the vehicle and postpones required maintenance.

Figure 11:
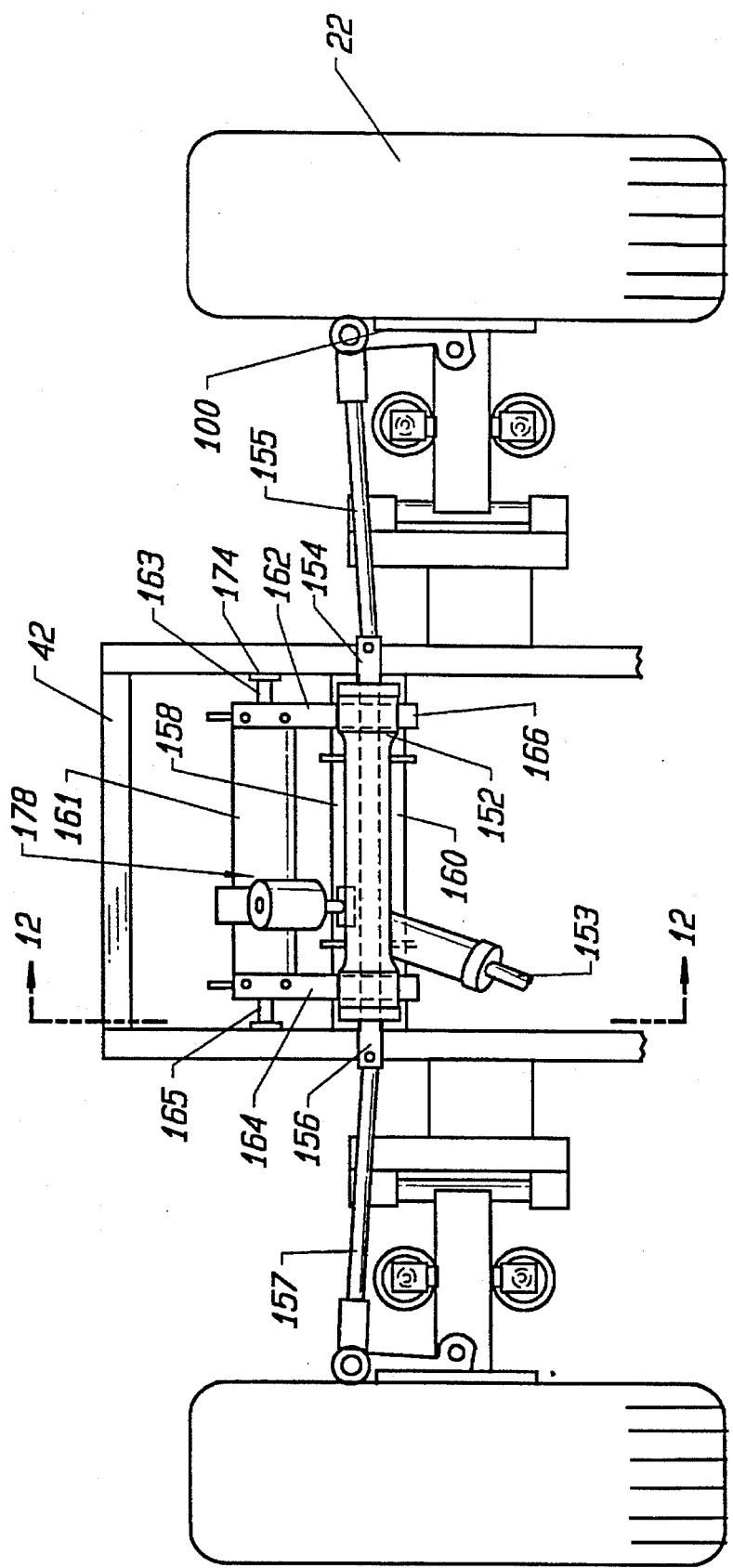
FIG. 11 depicts a top plan view of the steering system of the amphibious vehicle of FIG. 1.
Figure 12:
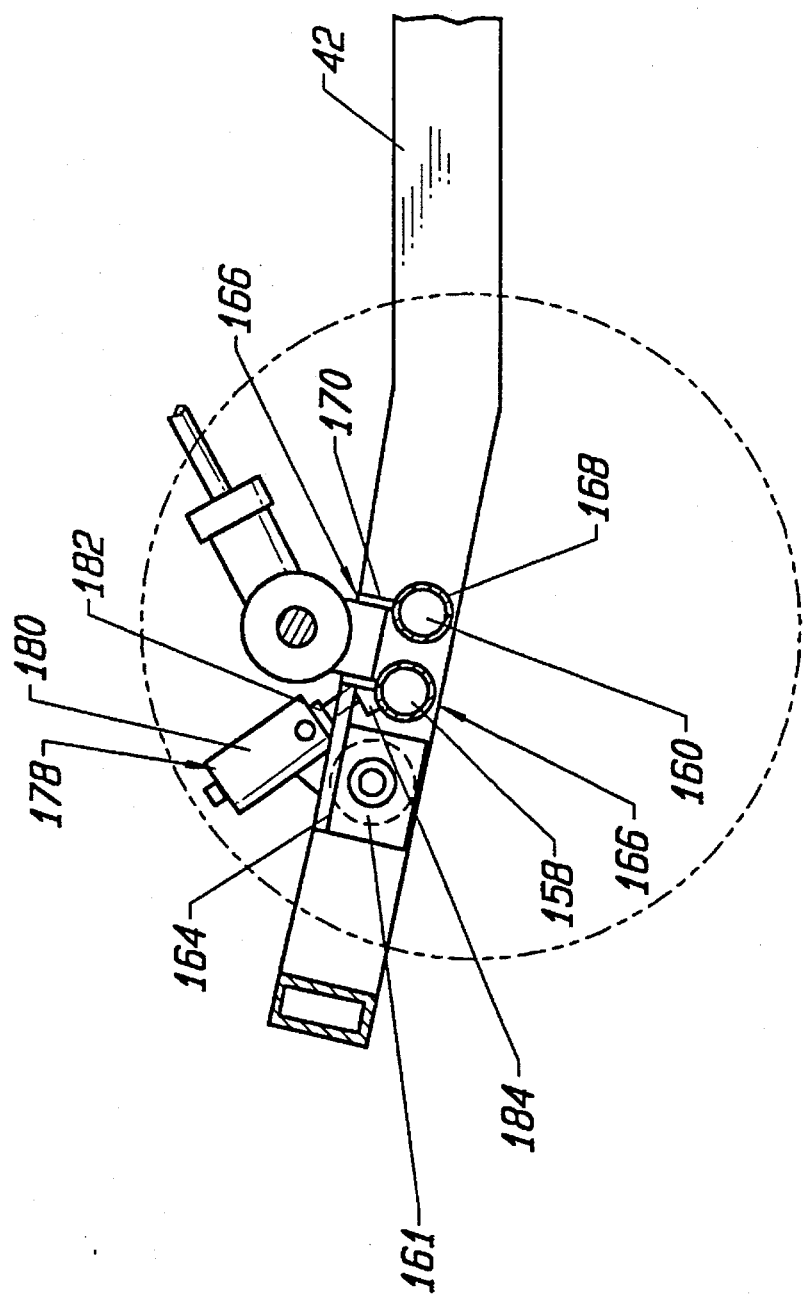
FIG. 12 depicts a cross sectional view taken substantially along line 12—12 of FIG. 11.
Figure 13:
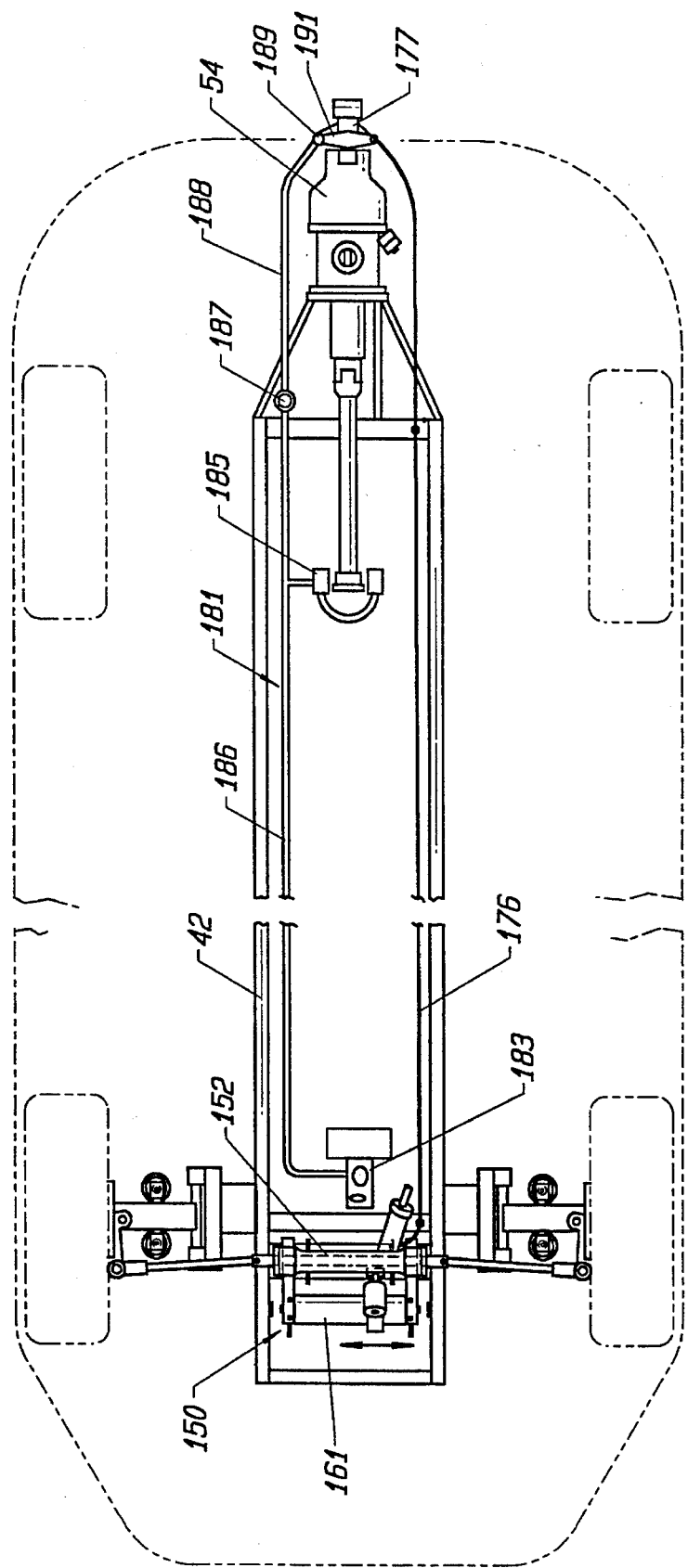
FIG. 13 depicts a top plan view of the steering and braking systems of the amphibious vehicle of FIG. 1.

Vehicle 10 includes means for guiding the direction of the vehicle during both land and marine operation, such as a steering assembly 150. Turning to FIGS. 11 to 13, the steering system of the present invention will be described in detail. Steering assembly 150 includes a guidance arrangement which is automatically adjustable between a land configuration for operation when the vehicle is in the land mode and a marine configuration for when the vehicle is in the marine mode. The guidance arrangement is provided by a conventional rack and pinion unit 152 controlled by steering wheel 28 through input shaft 153. A pair of steering control arms 154 and 156 project outwardly from either side of the rack and pinion steering unit, which translates rotation of the input shaft into lateral movement of the control arms. The distal end of control arm 154 is pivotably mounted to steering arm 155, which is mounted to steering knuckle 100, with the side-to-side movement of the control arm 154 altering the horizontal angle of the steering knuckle to control the direction of front wheel 22. Control arm 156 is similarly mounted to a steering arm 157, which is in turn mounted to a second steering knuckle to control the direction of another front wheel 22. Thus, the rack and pinion steering unit steers the vehicle during land operation through the lateral movement of control arms 154 and 156.

The present invention utilizes the side-to-side movement of the control arms to similarly guide the vehicle during marine operation. Steering assembly 150 includes two parallel, rack frame rods 158 and 160 mounted to vehicle frame 42. A pneumatic, single acting centering ram 161 having two pistons 163 and 165 extending from either side is positioned adjacent to the rack frame rods. Rack and pinion steering unit 152 is mounted to the centering ram through mounting brackets 162 and 164, and to frame rods 158 and 160 through slidable adapters 166, which are carried by the frame rods. The adapters 166 include a bushing 168 formed with a flange 170 which is secured to the rack and pinion steering unit (FIG. 12). Bushings 168, and therefore rack and pinion steering unit 152, are movable along the frame rods between vehicle frame 42 and stop flanges 173.

During land operation, centering ram 161 is powered, forcefully projecting pistons 163 and 165 outward with equal force to engage bump stops 174 mounted to vehicle frame 42. The centering ram is thereby secured in a stationary position, centering and preventing movement of the rack and pinion steering unit. In the land configuration, the lateral movement of control arms 154 and 156 alters the direction angle of steering knuckle 100 to steer the front wheels when driving the vehicle on land.

For operation of vehicle 10 in the marine mode, centering ram 161 is not powered (FIG. 13), leaving the pistons free to float in a horizontal plane. In the marine configuration, the centering ram is solely supported by frame rods 158 and 160, since the pistons do not engage vehicle frame 42. The rack and pinion steering unit and the centering ram are moved in a lateral direction as bushings 168 slide along frame rods 158 and 160. During marine operation, the wheels are in the raised position and the tires seat against the lower hull. Since the wheels are held against the hull, the angle of steering knuckle 100 may not be altered by the side-to-side movement of control arms 154 and 156, instead the lateral movement slides the rack and pinion steering unit in a lateral direction along rack frame rods 158 and 160. When in the marine configuration, the lateral movement of the rack and pinion steering unit controls the direction of thrust produced by marine jet pump 54. A marine steering cable 176 is mounted to rack and pinion steering unit 152 and attached to the marine drive steering gate 177 (FIG. 13). When the rack and pinion steering unit moves in a side-to-side direction, the steering cable 176 manipulates the steering gate 177 to control the direction of thrust. Thus, the vehicle is guided during marine operation by rotating the steering wheel and changing the direction of the jet pump thrust.

Centering ram 161, when powered, securely centers the rack and pinion steering unit. Steering assembly 150 includes means for locking the rack and pinion steering unit in the centered position. One such means is provided by a secondary securement device 178 which includes a double acting, pneumatic ram 180 (FIGS. 11 and 12). The pneumatic ram 180 is mounted to centering ram 161, and includes a machined locking pin 182. A fail-safe locking flange 184 is mounted to rack frame rod 158. When steering unit 152 is centered, pneumatic ram 180 is aligned with locking flange 184 and powered to thereby exert a pushing force driving pin 182 through an aperture formed in the locking flange. The interengagement between the locking pin 182 and the locking flange 184 retains the rack and pinion steering unit in the centered position should centering ram 161 fail during land operation. When operating the vehicle in the marine mode, pneumatic ram 180 is powered to pull locking pin 182 from flange 184, thereby releasing the rack and pinion steering unit for movement along the rack frame rods.

In another aspect of the present invention, vehicle 10 includes means for reducing the speed of the vehicle such as a braking system 181, shown in FIG. 13. The braking system includes a braking arrangement having a land configuration for reducing the speed of the vehicle during land operation, and a marine configuration for reducing the speed of the vehicle during marine operation. For land operation, the braking system includes conventional disc brakes having a conventional master cylinder 183. When the operator depresses the brake pedal with the braking arrangement in the land configuration, the master cylinder exerts pressure through hydraulic line 186 on front calipers (not shown) and rear calipers 185 for exerting a clamping force on front and rear disc rotors (not shown) to slow the wheels and, hence, the vehicle. Although not shown, the front calipers and disc rotors are mounted to steering knuckle 100, while the rear calipers and disc rotors are mounted to rear wheel drive hub 138 as with conventional vehicles.

Master cylinder 183 is connected by way of hydraulic line 186 to rear calipers 185 and to a solenoid-actuated fluid control valve 187. When the braking arrangement is in the marine configuration, the fluid valve 187 is energized to hydraulically connect the master cylinder 183 to marine hydraulic line 188 and single acting ram 189. Depressing the brake pedal during marine operation induces the master cylinder 183 to hydraulically power ram 189 to manipulate thrust steering gate 191. The steering gate 191 directs the vertical direction of thrust produced by the marine jet pump 54 in response to the degree of pressure applied to the brake pedal. When in the marine mode, the amount of pressure applied to the brake pedal proportionally increases the speed of the engine. Thus, when the brake pedal is rapidly depressed by the operator, the engine increases the amount of thrust produced to quickly reduce the speed of the vehicle. When the brake pedal is fully depressed, the steering gate substantially reverses the direction of thrust to substantially slow the forward progress of the vehicle. Safety switches (not shown) are preferably included to prevent the brake pedal from increasing the speed of the engine during land operation. With the vehicle of the present invention, the brake pedal is used to reduce the speed of the vehicle during both land and marine operation. The operation of braking system 181 is automatically shifted between the land configuration and the marine configuration by opening and closing fluid valve 187.

In an additional aspect of the present invention, vehicle 10 includes means for pneumatically controlling the conversion of the vehicle between the land and marine modes. One example of such pneumatic controlling means includes a pneumatic system 190, shown in FIGS. 14 and 15. The suspension retraction assemblies 70 and 71, the steering assembly 150, and the secondary securement devices 116 and 178 are converted between land and marine operation by the pneumatic system 190. The pneumatic system 190 includes a compressor 192 connected by a one-way fluid check valve 194 to an air filter 196 for removing any particulate contamination which may have entered the system through the compressor. In the preferred form, the air filter removes or traps water which is present in the air. A minimum pressure switch 198, connected in parallel with the air filter to the compressor, provides operation of the compressor when the pressure of the system is below a predetermined pressure level.

An air/water separator or dryer 200 removes any water remaining in the air exiting from the air filter. A main air supply tank 202 receives compressed air passing through the air/water separator, retaining a quantity of compressed air for shifting the vehicle between a land configuration and a marine configuration. In the preferred form, the main supply tank holds sufficient air to complete two cycles of the suspension retraction systems. A pop-off valve 204 automatically bleeds compressed air from the system when the pressure exceeds a maximum level, preventing catastrophic failure of the pneumatic system.

Figure 15:
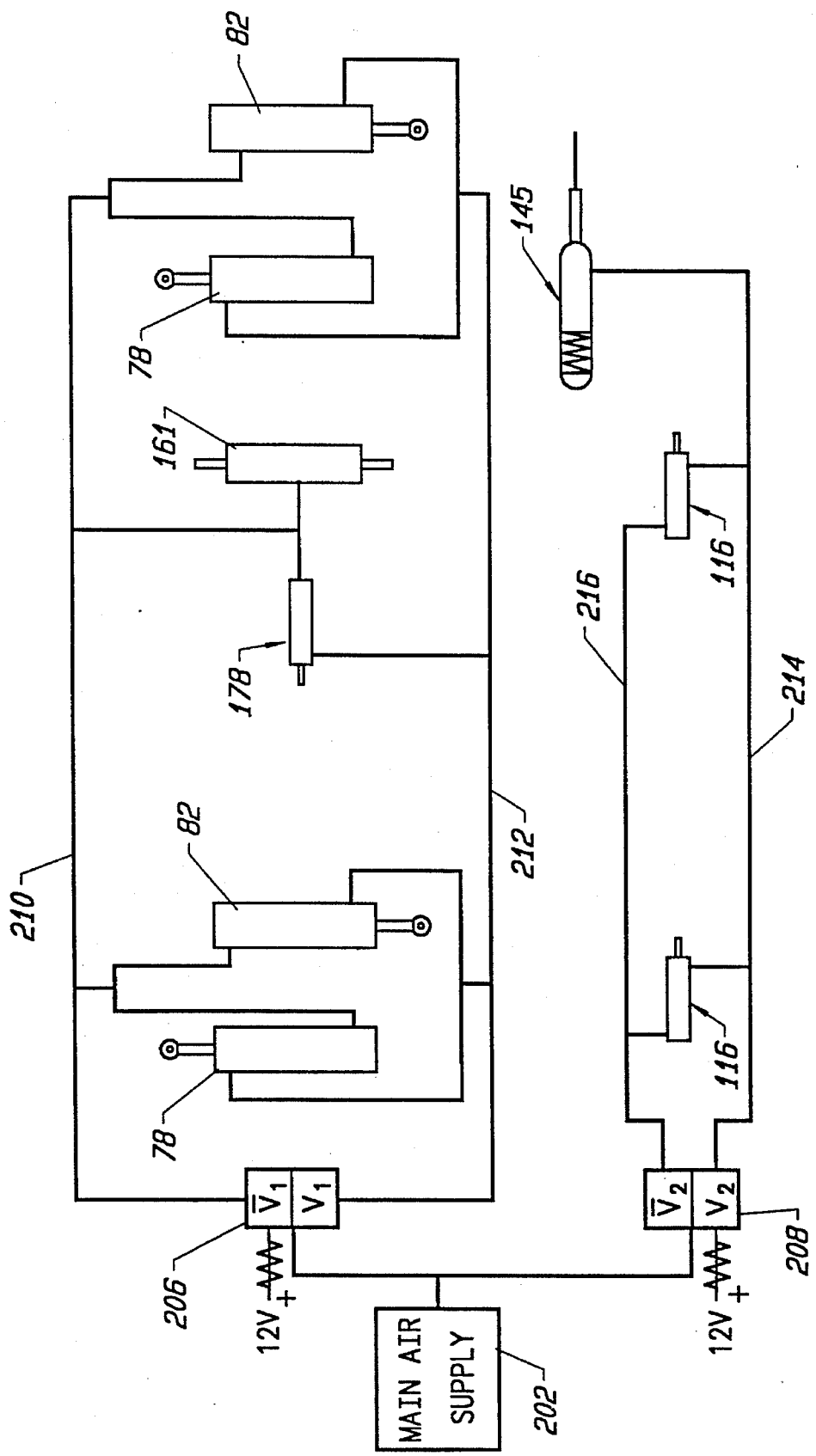
FIG. 15 depicts a schematic diagram illustrating the pneumatic control system of FIG. 14.

As is shown particularly in FIG. 15, the compressed air held within supply tank 202 is selectively directed to power the pneumatic rams of the suspension retraction system and the steering system to alternatively provide a pushing or pulling force by solenoid-actuated fluid valve 206. A solenoid-actuated fluid valve 208 directs compressed air to power the pneumatic rams of suspension securement devices 116 and lubricant system 145 to either apply a pushing a pulling force. When valve 206 is energized to convert to a land configuration, air is injected into fluid line 210 to power the front and rear suspension system pneumatic rams 78 and 82 to exert a pushing force, extending suspensions 72 and 73 and lowering the wheels 22. The steering system centering ram 161 is powered to center the rack and pinion steering unit, and pneumatic ram 180 of the steering secondary securement device exerts a pushing force to safely retain the rack and pinion steering unit in the centered position. When the fluid valve 206 is energized to shift to the marine configuration, air is injected into fluid line 212, powering the pneumatic ram to exert a pulling force, thereby retracting the suspensions and raising the wheels, and releasing the rack and pinion steering unit 152. Thus, the conversion of vehicle 10 between a land configuration and a marine configuration is pneumatically controlled by selectively energizing fluid valve 206.

The operation of the suspension securement devices 116 and the lubricant system 145 is controlled by the actuation of fluid valve 208. When energized prior to shifting between land and marine modes, air is injected into fluid line 214. The pneumatic rams retract the locking pins from interengagement with the respective apertures and the greasing system is activated, injecting a predetermined quantity of grease to distribution blocks 148. The pneumatic rams 126 extend the locking pins into interengagement with the respective apertures when the fluid valve 208 is energized after shifting between modes of operation, injecting air into fluid line 216. Thus, the pneumatic system of the present invention automatically controls the release of the suspension securement devices to move the suspensions between a retracted and an extended position.

In a further aspect of the present invention, vehicle 10 includes means for automatically converting the vehicle between a land configuration and a marine configuration. One example of such automatic converting means is a vehicle transition control unit 220, shown in FIG. 16. As is described above, the suspension retraction systems 70 and 71, the steering system 150 and the secondary securement devices 116 and 178 are automatically shifted between modes of operation by selectively energizing a pair of fluid valves 206 and 208. The braking system is selectively converted to a marine configuration by energizing fluid valve 187. Vehicle transition control unit 220 selectively energizes the respective fluid valves to change the configuration of the vehicle. The arrangement of the vehicle transition control unit will be described in detail in relation to FIG. 16. A more detailed description of the operation of control unit 220, and the conversion of the vehicle between land and marine modes, is included below with the discussion of FIGS. 17 and 18.

The vehicle transition control unit 220 is electrically connected to means for sensing the condition of the vehicle, such as a plurality of conventional sensing devices 221. The manually actuable switch 34 is electrically connected to the control unit for initiating the transition of the vehicle between land and marine operation. In addition, the control unit 220 is electrically connected to the fluid valves 187, 206 and 208, the final drive selector 50, and the electronic engine management control 47. The control unit 220 is configured to control the operation of the different components of the vehicle in response to input received from the various sensors.

The operation of the marine drive 54 is controlled in response to input received by a minimum pressure sensing device 222 and a water sensing device 224. The pressure sensing device is mounted in the marine drive 54 to detect the production of a minimum amount of water pressure, indicating the generation of a minimum amount of thrust. The water sensing device is mounted to the exterior of lower hull portion 16 to detect when the vehicle has entered a body of water. The jet pump 54 is activated when the presence of water at the lower hull is detected. The marine drive will remain activated so long as the production of a minimum amount of pressure is detected.

Figure 14:
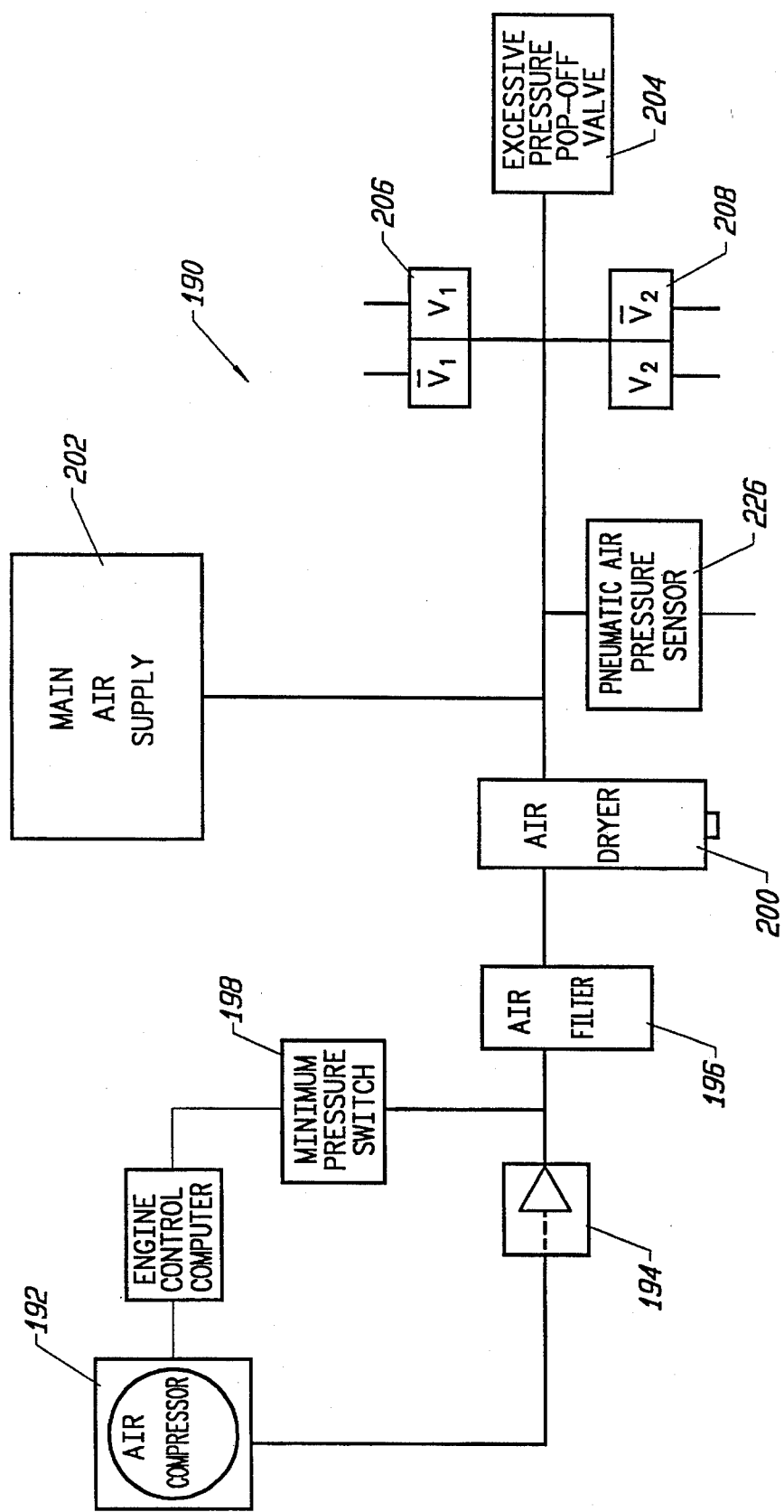
FIG. 14 depicts a block diagram illustrating the pneumatic control system of the amphibious vehicle of FIG. 1.

Once switch 34 has been activated to initiate shift of the vehicle between modes, the vehicle transition control unit 220 receives input concerning the status of pneumatic system 190 and suspension retraction systems 70 and 71. A minimum pressure sensing device 226 is included in the main supply line of the pneumatic system (FIG. 14). Mass proximity detecting devices 228, 230 and 232 are mounted to suspension retraction assemblies 70 and 71 and steering assembly 150 respectively to determine whether secondary devices 116 and 178 are in the engaged position. Mass proximity detecting devices 234 and 236 are mounted to the front and rear suspension retracting devices 70 and 71 to determine whether the front and rear suspensions 72 and 73 are in the retracted or extended position. A mass proximity detecting device 238 is mounted in pneumatic line 210 to determine when the rack and pinion steering unit 152 is secured in the centered position. Alternatively, a minimum pressure sensing device may be used to determining the centering of steering unit 152. While in the preferred embodiment mass proximity detectors are used, other sensing means may be substituted, such as another form of magnetic switch or a conventional type switch. Similarly, one or several sensing devices may be used to detect the status of the vehicle 10.

In response to input from the various sensing devices, the control unit 220 will direct the final drive selector 50 to drive the rear wheels 22 alone, both the rear wheels and marine drive simultaneously, or the jet pump 54 alone. The operation of the electronic engine management unit 47 is controlled by the control unit 220. Further, the unlocking, raising and locking of the independent suspensions 72 and 73, and the unlocking, centering, and locking of the steering 150 are also controlled by the vehicle transition control unit. The control unit 220 further enables the illumination of the standard, land mode lights of the land configuration during land operation and the marine running lights of the marine configuration during marine operation.

OPERATION OF THE VEHICLE

The operation of the vehicle, and the conversion between the land and marine modes will be described in detail with reference to FIGS. 17 and 18. During land operation, the vehicle is operated in much the same manner as a standard car or truck. The operator depresses the gas and brake pedals to control the speed of the vehicle, and manipulates the steering wheel to control the vehicle's direction of travel. When in the land mode, the marine drive 54 will be activated by the final drive selector 50 if the vehicle is driven through water. When the water sensing device 224 detects the presence of water at the lower hull 16, control unit 220 directs the activation of jet pump 54. The jet pump will continue to operate so long as pressure sensing device 222 detects the production of sufficient thrust to impart motion to the vehicle or water sensing device 224 detects the presence of water adjacent the body portion 12. Thus, the amphibious vehicle of the present invention may be driven through water under force of the rear wheels and the marine jet pump without actually shifting to the marine mode.

Figure 17:
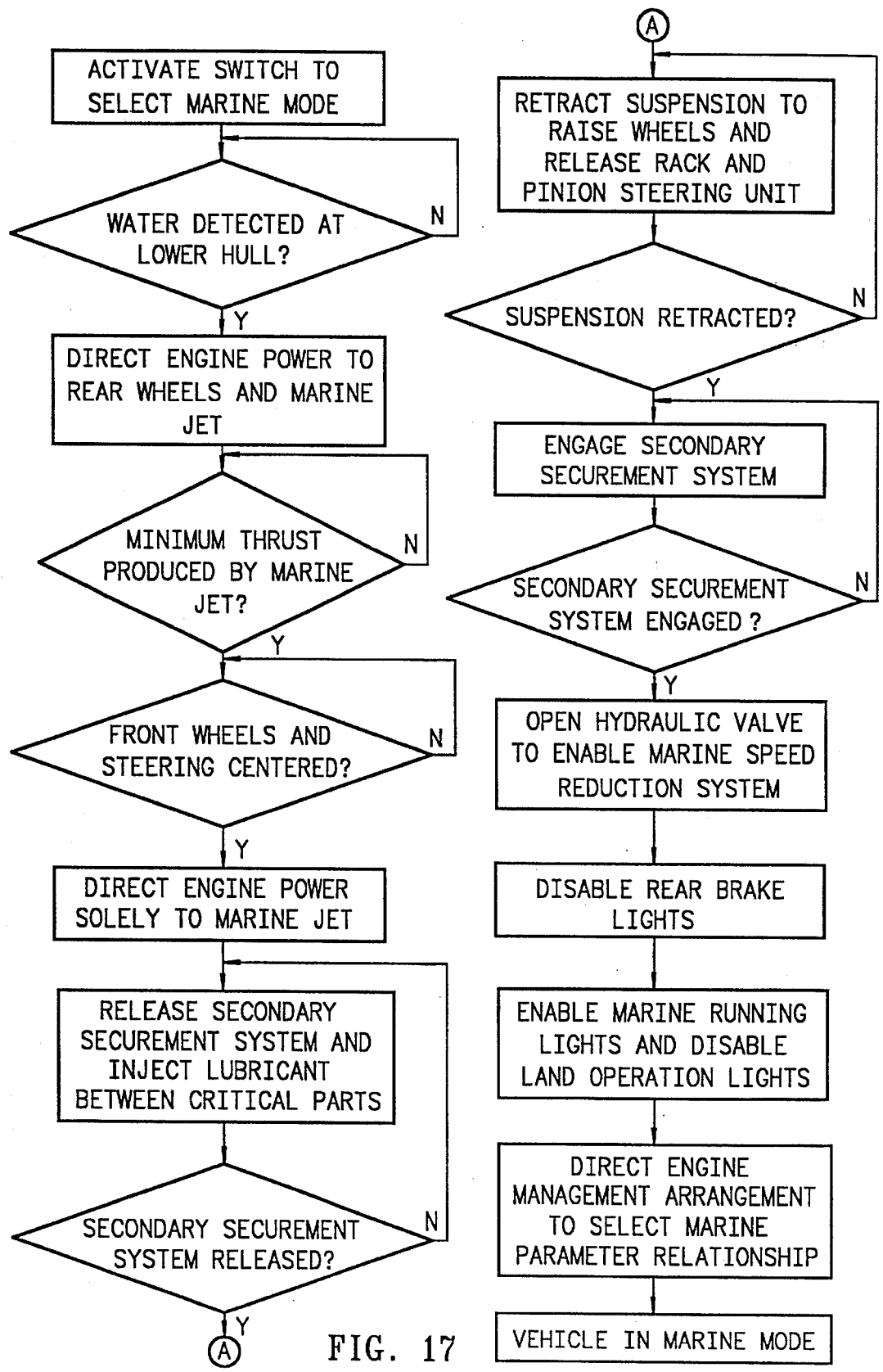
FIG. 17 depicts a logic diagram showing the conversion of the amphibious vehicle of FIG. 1 from land operation to marine operation.

When an operator of the amphibious vehicle decides to use the vehicle 10 for transportation on water, the operator actuates switch 34 to initialize the conversion from the land to the marine mode and directs the vehicle into a body of water from the shore (FIG. 17). Once the vehicle is driven a certain distance into the water, the water sensing device 224 senses the presence of water at lower hull portion 16. In response to the presence of water, the control unit 220 directs the final drive selector 50 to simultaneously transmit power to the rear wheel drive shaft 52 and the marine jet pump 54. During the transition between the land and marine modes, engine power is directed to both the rear wheels and the jet pump to propel the vehicle, thereby preventing interruption of the forward progress of the vehicle.

The final drive selector 50 will continue to direct engine power to the rear wheel drive shaft while preparing to retract suspension 72 and 73. Once the minimum pressure sensing device 222 detects the generation of sufficient thrust to impart motion to the vehicle and mass proximity sensor 238 senses that the front wheel steering is centered, the control unit 220 energizes fluid valve 208 to release the secondary securement devices 116 and activate lubrication system 145 to automatically lubricate critical parts of the suspension and steering. The final drive selector 50 is then directed to transmit engine power solely to the marine jet pump in accordance with the marine operation of switch 34. The vehicle is now propelled entirely by the marine drive 54 for the remainder of the transition mode.

Figure 16:
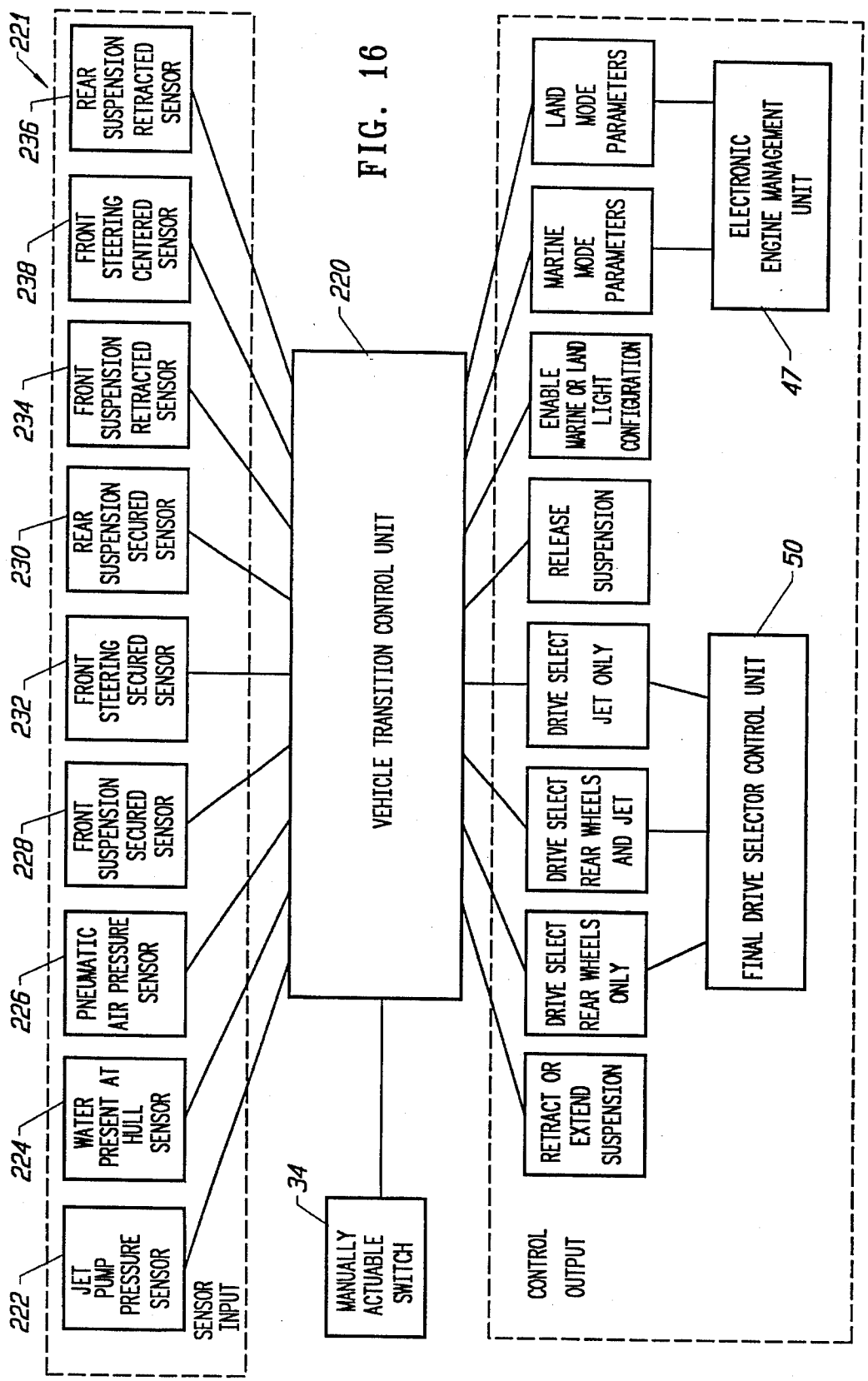
FIG. 16 depicts a block diagram illustrating the vehicle transition control unit of the amphibious vehicle of FIG. 1.

Once the mass proximity detecting devices 228 and 230 sense the release of secondary securement devices 116, the control unit energizes fluid valve 206 (FIG. 16). A quantity of compressed air is injected into fluid line 212, powering pneumatic rams 78 and 82 to retract suspensions 72 and 73 and releasing pistons 163. The wheels are raised, with the tires seating against and, together with split seals 31 and 33, substantially sealing the lower hull portion 16. To prevent accidental extension of the suspensions and lowering of the wheels during marine operation, the retraction of the suspensions is sensed and the fluid valve 208 energized. Pneumatic rams 126 are energized, with pin 128 engaging slats 118 and 120 to secure the suspensions in the raised position.

Once the mass proximity detecting devices 228 and 230 detect that the securement devices 116 are in the engaged position, control unit 220 energizes fluid valve 187 to open hydraulic line 188. Depression of the brake pedal will now control hydraulic ram 189 to manipulate steering gate 191, thereby altering the direction of thrust to reduce the speed of the vehicle. The control unit 220 enables the marine running lights, disabling the brake lights and land side marker lights. To complete the transition to marine mode, the engine management control unit alters operation of the engine to adapt to marine load requirements. The engine is then efficiently operated in a marine mode.

The conversion of the vehicle to marine operation is now complete. While the vehicle is in the marine mode, the operator drives the vehicle using the same controls as are used for land operation. With the present invention, the vehicle is operated as a standard car or truck, rather than a boat, substantially reducing operator confusion.

Figure 18:
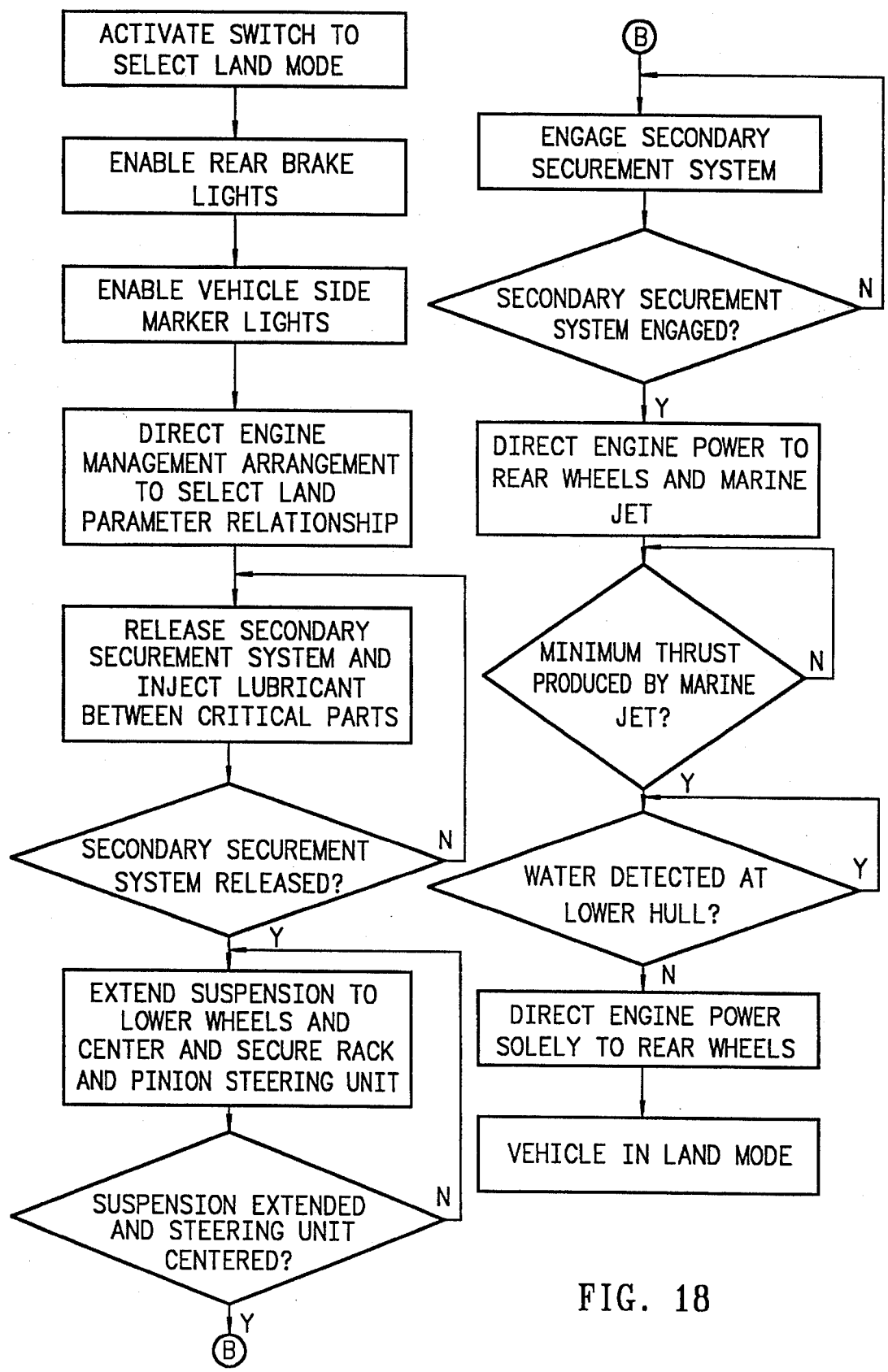
FIG. 18 depicts a logic diagram showing the conversion of the amphibious vehicle of FIG. 1 from marine operation to land operation.

To initialize conversion of the vehicle from marine operation to land operation, the operator actuates switch 34 and directs the vehicle to the shore or docking area (FIG. 18). Once the marine mode has been deactivated by the operator, the vehicle transition control unit 220 enables the rear brake lights and the land side marker lights. The engine management control arrangement alters engine operation to the land configuration, optimizing the efficiency of the engine while the vehicle is in transition between the marine mode and the land mode.

As with the transition to marine mode, the final drive selector 50 will direct power from engine 46 to both the rear wheel drive shaft 52 and the jet pump 54, enabling the operator to drive continuously and directly from the water onto land. Before driving the rear wheel drive shaft, the suspension must be extended to lower the front and rear wheels. The control unit 220 therefore energizes fluid valve 208 (FIG. 15), powering the pneumatic rams to release securement devices 116, and provide the critical suspension and steering parts with a quantity of grease by actuating lubricant system 145. Once the control unit senses the release of the securement devices, the fluid valve 206 is energized. This powers pneumatic rams 78 and 82 to extend suspensions 72 and 73. Pneumatic centering ram 161 is simultaneously powered, centering and securing the rack and pinion steering unit 152. Once steering unit 152 is centered steering gate 177 is also centered, with the thrust produced by the engine propelling the vehicle in a forward direction. Rotation of the steering wheel will now cause control arms 154 and 156 to steer front wheels 22.

The mass proximity sensing devices 234 and 236 detect that the suspension has been extended, lowering the wheels. The fluid valve 208 is then energized, powering the pneumatic rams 126 of securement devices 116 to secure the suspensions in the extended position. Final drive selector 50 directs engine power to the rear wheel drive shaft 52 and the marine drive 54, and the mass proximity sensing devices 228 and 230 sense that the securement devices are in the engaged position. When the wheels contact land, the vehicle will be propelled by both the rear wheels and the jet pump as the vehicle exits the water.

The marine drive 54 will continue to operate until the vehicle has left the water. Once the water sensing device 224 no longer senses water present at the lower hull portion 16, and the pressure sensing device 222 no longer senses the production of a minimum amount of thrust, the control unit 220 directs the final drive selector 50 to direct engine power only to the rear wheel drive shaft 52. The amphibious vehicle 10 is now operating in the land mode.

As is apparent from the foregoing discussion, the present invention provides an amphibious vehicle which may be efficiently and conveniently converted between a land mode and a marine mode. The only operator input necessary is the activation of the operator actuable switch. The vehicle is fully functional during the transition mode, enabling the operator to continue forward progress while the vehicle is converted between the land and marine modes. The construction of the present invention provides an amphibious vehicle which is reliable, and which may be easily manufactured and maintained.

What is claimed is:

1. In an amphibious vehicle, the combination comprising:
   (a) means for providing land motive force;
   (b) means for providing marine motive force;
   (c) an engine positioned within the vehicle and connected to provide power both to said land motive means and to said marine motive means;
   (d) means operatively connected to said engine for directing engine power selectively to said land motive means and to said marine motive means;
   (e) an engine management arrangement defining two or more sets of dependent relationships between various engine operating parameters, one of said sets determining engine operation when said engine power directing means directs said engine power to said land motive means and the other of said sets determining engine operation when said engine power directing means directs said engine power only to said marine motive means;
   (f) a manually actuable switch positioned within said vehicle for activation by an operator of said vehicle for initiating shifting between land operation and marine operation; and
   (g) means for sensing production of water pressure by said marine motive means, and wherein
   said directing means is configured to direct said engine power to said marine motive means so long as said pressure sensing means detects the generation of an adequate amount of water pressure by said marine motive means for producing sufficient thrust to impart motion to said vehicle.

2. The amphibious vehicle of claim 1 further including a vehicle transition control arrangement configured for automatically converting the operation of said vehicle between land operation and marine operation, said vehicle transition control arrangement being configured for receiving input from said pressure sensing means and controlling the operation of said directing means in response to said input, among others, to direct engine power to said marine motive means, and the combination of said land motive means and said marine motive means.

3. In an amphibious vehicle, the combination comprising:
   (a) means for providing land motive force;
   (b) means for providing marine motive force;
   (c) an engine positioned within the vehicle and connected to provide power both to said land motive means and to said marine motive means;
   (d) means operatively connected to said engine for directing engine power selectively to said land motive means and to said marine motive means;
   (e) an engine management arrangement defining two or more sets of dependent relationships between various engine operating parameters, one of said sets determining engine operation when said engine power directing means directs said engine power to said land motive means and the other of said sets determining engine operation when said engine power directing means directs said engine power only to said marine motive means;
   (f) a manually actuable switch positioned within said vehicle for activation by an operator of said vehicle for initiating shifting between land operation and marine operation; and
   means for sensing the production of water pressure by said marine motive means, and wherein
   said directing means is configured for directing said engine power solely to said marine motive means when said pressure sensing means detects the generation of an adequate amount of pressure to produce sufficient thrust for imparting motion to said vehicle and said manually actuable switch is in the marine operation mode.

4. In an amphibious vehicle, the combination comprising:

(a) means for providing land motive force;

(b) means for providing marine motive force;

(c) an engine positioned within the vehicle to provide power to said land motive means and to said marine motive means;

(d) means operatively connected to said engine for directing engine power selectively to said land motive means solely, or to said marine motive means solely; and (e) an operator actuable control arrangement for operation of said vehicle both when said engine power of said engine is directed to said land motive means solely and when it is directed to said marine motive means solely, said operator actuable control arrangement including means for guiding the direction of said vehicle during both land operation and marine operation; and (f) means for automatically converting said guiding means between a land configuration and a marine configuration.

5. The amphibious vehicle of claim 4 further including means for locking said guiding means in at least one of said land configuration and said marine configuration.

6. The amphibious vehicle of claim 4 wherein, said direction guiding means includes a rack and pinion steering device operatively connected to said land motive means and to said marine motive means for selectively translating operator input from a steering instrument to one of said land motive means and said marine motive means, said rack and pinion steering device being adjustable between a secured position in which it guides said vehicle when said engine power is directed to said land motive means, and a floating position, for guiding said vehicle when said engine power is directed solely to said marine motive means.

7. The amphibious vehicle of claim 6 further including means for locking said rack and pinion steering device in at least one of said secured position and said floating position.

8. The amphibious vehicle of claim 6 wherein said steering instrument includes a handwheel positioned for actuation by an operator of said vehicle, which handwheel is movable by said operator between a plurality of positions through rotation for guiding said vehicle in a selected direction during both land operation and marine operation.

9. The amphibious vehicle of claim 4 wherein said control arrangement includes a braking arrangement having a land configuration for reducing the speed of said vehicle during land operation and a marine configuration for reducing the speed of said vehicle during marine operation further including, means for automatically converting said braking arrangement from said land configuration and said marine configuration.

10. The amphibious vehicle of claim 9 wherein said breaking arrangement includes an operator actuable braking instrument movable between several positions by an operator for controlling the speed of said vehicle.

11. The amphibious vehicle of claim 10 wherein said braking instrument is a brake pedal positioned for actuation by the foot of an operator.

12. The amphibious vehicle of claim 10 wherein said braking arrangement includes a fluid line connecting said braking instrument to said land motive means and to said marine motive means, and said converting means including a hydraulic valve positioned in said fluid line for directing fluid pressure within said fluid line to said marine motive means.

13. The amphibious vehicle of claim 4 wherein, a vehicle transition control arrangement is operatively connected to said guiding means for controlling adjustment thereof between land and marine configurations.

14. The amphibious vehicle of claim 13 further including means for locking said guidance control arrangement in at least one of said land configuration and said marine configuration, said vehicle transition control arrangement being operatively connected to said securing means for controlling the operation of said securing means to lock said guidance control arrangement in at least one of said land configuration and said marine configuration.

15. The amphibious vehicle of claim 4 wherein said operator actuable control arrangement includes a steering device operatively connected to said land motive means and to said marine motive means for selectively translating operator input from a steering instrument to one of said land motive means and said marine motive means.

16. The amphibious vehicle of claim 15 wherein said operator actuable control arrangement further includes a braking arrangement having a land configuration for reducing the speed of said vehicle during land operation and a marine configuration for reducing the speed of said vehicle during marine operation.

* * * * *